US011399164B2

(12) United States Patent
Ranieri et al.

(10) Patent No.: US 11,399,164 B2
(45) Date of Patent: Jul. 26, 2022

(54) SYSTEM AND METHOD FOR INCREASED SPATIAL RESOLUTION

(71) Applicant: Disney Enterprises, Inc., Burbank, CA (US)

(72) Inventors: Nicola Ranieri, Ennenda (CH); Markus Gross, Zurich (CH); Quinn Yorklun Jen Smithwick, Pasadena, CA (US); Hagen Friedrich Seifert, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 634 days.

(21) Appl. No.: 14/635,563

(22) Filed: Mar. 2, 2015

(65) Prior Publication Data
US 2016/0261838 A1 Sep. 8, 2016

(51) Int. Cl.
*H04N 9/31* (2006.01)
*G03B 21/00* (2006.01)

(52) U.S. Cl.
CPC ......... *H04N 9/3188* (2013.01); *G03B 21/008* (2013.01); *H04N 9/312* (2013.01); *H04N 9/317* (2013.01); *H04N 9/3111* (2013.01); *H04N 9/3129* (2013.01); *H04N 9/3155* (2013.01); *H04N 9/3161* (2013.01); *H04N 9/3182* (2013.01); *H04N 9/3185* (2013.01)

(58) Field of Classification Search
CPC .... G03B 21/008; H04N 9/3102; H04N 9/312; H04N 9/3188; H04N 9/3111; H04N 9/3129; H04N 9/3155; H04N 9/3161; H04N 9/317; H04N 9/3182; H04N 9/3185

USPC .... 348/744, 745, 771, 756, 759; 353/79, 49; 372/26
See application file for complete search history.

(56) References Cited

U.S. PATENT DOCUMENTS 7,357,513 B2 *  4/2008  Watson ................ H01S 5/141
                                              348/744
2005/0024482 A1  2/2005  Yonekubo
2007/0146556 A1 * 6/2007  Fujimori ............... H04N 11/26
                                              348/744

(Continued)

FOREIGN PATENT DOCUMENTS

WO    2007075995 A2    7/2007

OTHER PUBLICATIONS

Eichenlaub, Jesse B. et al., "UHD Projector System", Dimension Technologies, Inc., Rochester, NY, USA, Jul. 31, 2010, pp. 1-51.

(Continued)

*Primary Examiner* — Sherrie Hsia
(74) *Attorney, Agent, or Firm* — Dorsey & Whitney LLP

(57) ABSTRACT

The present disclosure generally relates to a projection system with increased spatial resolution. The projection system includes one or more light sources, a spatial light modulator configured to reflect light received from the one or more light sources to generate a plurality of sub-images of a composite image, and an optical system configured to reflect each of the plurality of sub-images the sub-images at a different portion of a projection surface. By projecting the single composite image using a plurality of sub-images projected at different times and/or locations from one another, the composite full image has a higher resolution as compared to the resolution defined by the hardware of the spatial light modulator and light sources.

26 Claims, 14 Drawing Sheets

(56) References Cited

U.S. PATENT DOCUMENTS

2008/0088800 A1   4/2008  Bellis et al.

OTHER PUBLICATIONS

European Patent Office, "Extended European Search Report dated Jun. 29, 2016", European Patent Application No. 16158326.5, dated Jun. 29, 2016, 8 Pages.
Jones, Andrew et al., "Rendering for an Interactive 360 Degree Light Field Display", SIGGRAPH, to appear in the ACM SIGGRAPH conference proceedings., 2007, pp. 1-10.

* cited by examiner

SYSTEM AND METHOD FOR INCREASED SPATIAL RESOLUTION

TECHNICAL FIELD

The present disclosure relates generally to projection systems, and specifically to a system for improving the spatial resolution of projected images.

BACKGROUND

Projection systems display visual content, such as motion pictures, photographs, or the like, and are widely applicable in fields such as cinemas, exhibitions, and theme parks. Typical projection systems include a light source, a color generator, such as a rotating color wheel or dichroic optical system, and a high speed image forming device such as a digital micro-mirror device (DMD). Two common technical specifications of DMDs are the spatial resolution and the temporal resolution. The spatial resolution generally refers to the clarity of an image, which is determined by the number of independent pixels per unit distance. Spatial resolution is distinct from pixel count. That is, the number of pixels in an image has no bearing on the spatial resolution, or clarity of the image. In typical projection systems, the native resolution of the DMD is equal to the spatial resolution of the projected image. Temporal resolution generally refers to the refresh rate, or update frequency, of the DMD. DMD's can have refresh rates in the tens of thousands cycles per second, and temporal resolution continues to improve with each generation. To produce greyscale images, the mirrors may be toggled on and off very quickly, where the ratio of time on to time off determines the shade produced. The beam may be further combined with a rotating color wheel to generate a sequence of color images that, when displayed on the display surface in rapid succession appear to a viewer as a single color image, or frame. Sequences of frames at a sufficiently high frame rate then appear to viewers a seamlessly moving image.

SUMMARY

According to one embodiment described herein, a projection system is disclosed. The projection system may include one or more light sources, a spatial light modulator configured to reflect light received from the one or more light sources to generate a plurality of sub-images of a composite image, and an optical system configured to reflect each of the plurality of sub-images the sub-images at a different portion of a projection surface.

According to another embodiment described herein, a method for projecting an image is disclosed. The method may include steps of configuring a digital micro-mirror device to selectively modulate a first portion of a complete image, activating at least one light source to emit a first light beam, selectively modulating the first light beam off of the digital micro-mirror device, and projecting the portion of the complete image onto a projection surface. The method may further include the steps of configuring the digital micro-mirror device to selectively modulate a second portion of the complete image, activating at least one light source to emit a second light beam, selectively modulating the second light beam off of the digital micro-mirror device, and projecting the second portion of the complete image on the projection surface.

According to yet another embodiment described herein, a projection system is described. The projection system may include a digital micro-mirror device configured to selectively modulate sub-images of a composite image, a plurality of laser arrays, each laser array having a set of laser stored therein and directed toward the digital micro-mirror device, and a plurality of fixed mirrors, wherein each of the fixed mirrors in the plurality of fixed mirrors is configured to direct light from one laser array in the plurality of laser arrays toward a sub-image region in a projection surface.

DETAILED DESCRIPTION

Embodiments of the present invention recognize that in order to provide viewers at different distances with a satisfactory viewing experience, the resolution of the projection system should be sufficiently high such that the pixel raster cannot be seen from any typical point of view. Specifically, the image must be large enough so that viewers far away clearly see the image but have sufficiently high spatial resolution such that viewers close to the projected image do not see the individual pixels. Because typical projection systems generate a representation of the entire projected image in each image forming device cycle, the spatial resolution of the projected image is historical limited by the native resolution of the image forming device (e.g., a DMD, liquid crystal, or other spatial light modulator). Additionally, fast image forming devices operate at sufficiently high refresh rates that the cycles required to generate a smooth sequence of images without flickering is generally less than the physical limits of the image forming device. That is, the temporal resolution is higher than required for smooth projection of motion pictures.

Disclosed herein are embodiments for projection systems and methods of projecting images that exploit the excess temporal resolution to increase the spatial resolution of the projected images. Embodiments disclosed herein may use directional light sources and temporally multiplexed image quadrants to tile sub-images which are perceived as a single image. In particular, the systems and methods disclosed herein sequentially project one or more sub-images on a portion of a projection surface at a rapid rate so that the viewer perceives the sub-images as a single image. This allows the spatial resolution of the projector to be increased beyond the native resolution or hardware constrained spatial resolution of the projector. In other words, by exploiting the human eye's perceptible frame rate, the perceived spatial resolution of the projection may be increased beyond the spatial resolution dictated by the hardware components. For example, the projection system may project a plurality of image portions defining a single frame individually, so that the image portions are not projected simultaneously. Each image portion, however, may be projected sufficiently quickly so that a viewer will perceive each of the image portions substantially simultaneously so that the single frame may appear projected as a single image, although it is projected as a number of individual components. As used herein, the term "frame rate" applies to both the frame rate of the sub-images and the frame rate of the complete image. "Exposure time" refers to the time during which each sub-image is projected on a projection surface.

Figure 1:
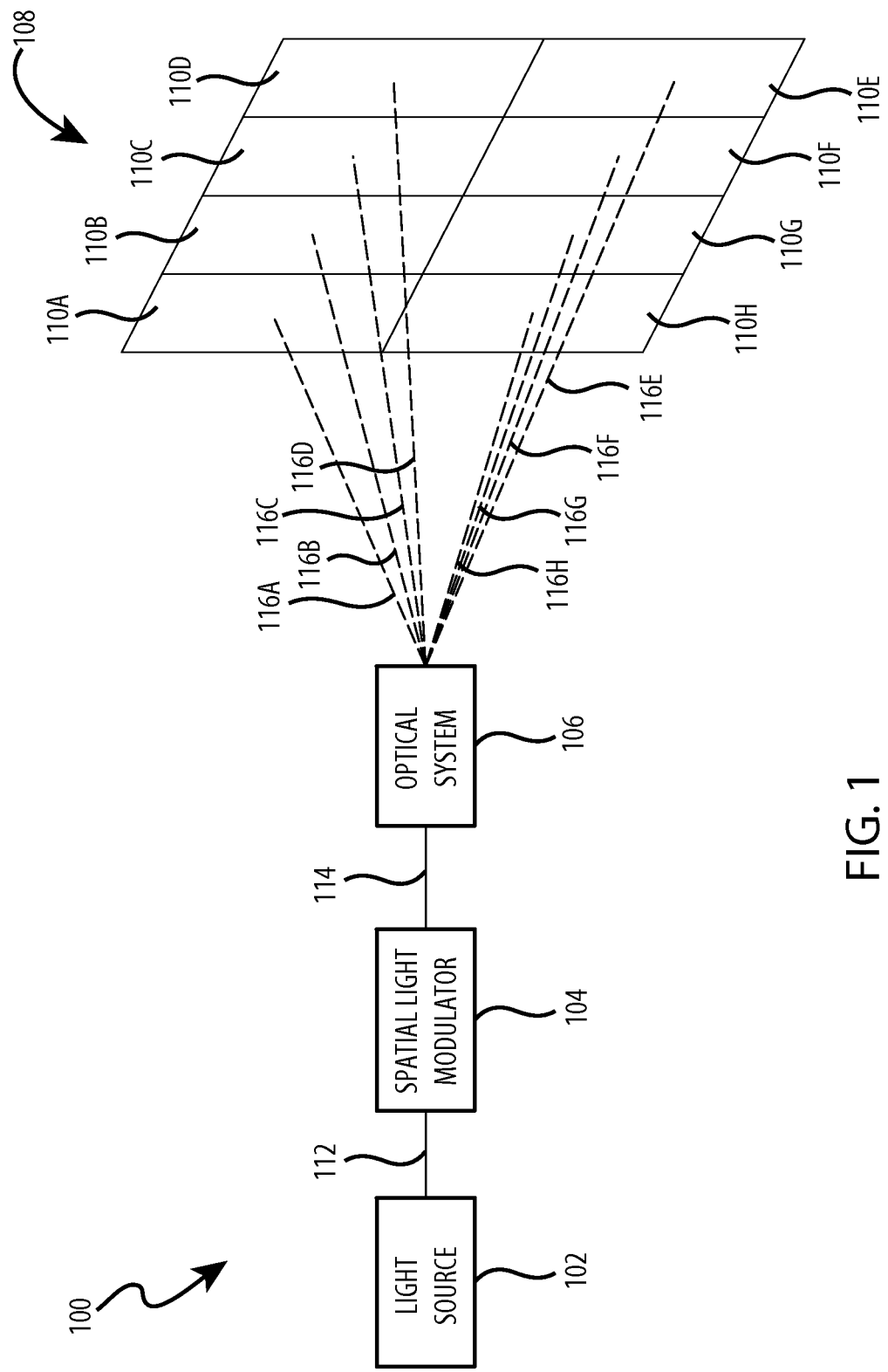
FIG. 1 is a system diagram of a projection system for field-sequentially improving the spatial resolution of a projected image.

FIG. 1 is a system diagram of a projection system, generally designated 100, for field-sequentially improving the spatial resolution of a projected image. Projection system 100 includes a light source 102, an image forming device 104, and an optical system 106.

In various embodiments, the light source 102 may be any optical source capable of generating one or more beams of light 112. In certain embodiments, the light source 102 includes one or more lasers, light emitting diodes (LEDs), organic light emitting diodes (OLEDs), or any similar device for emitting light. In some embodiments, the light source 102 emits a light beam 112 as a point source or near point source. In other embodiments, the light source 102 emits light beam 112 over a surface area. The light source 102 may emit light beams 112 at one or more distinct frequencies (i.e. colors). For example, the light source 102 may emit three beams 112 of component colors (e.g. red, green, blue). In yet other embodiments, the light source 102 may emit light beam 112 consisting of white light that may be processed by optical elements, such as color filters, in order to produce color images. The light source 102 may include a plurality of individual light emitters (e.g., lasers) that may be sequentially activated and deactivated. In certain embodiments, the light source 102 can configure the intensity of light beam 112, for example, by an electronic device. In general, the light source 102 may be any device, or combination of devices, capable of generating a directed beam of light.

The image forming device 104 is an optical element capable of converting the light beam(s) 112 generated by the light source 102 into a portion of a complete image. In various embodiments, image forming device may be a spatial light modulator, such as a DMD or a liquid crystal which can selectively modulate portions of light beam 112 to generate a sub-image of a larger image to be projected by the projection system 100. In general, the image forming device 104 may be any device capable of generating a number of sub-images at a sufficiently high rate that the sub-images may be projected generally adjacent to one another such that an observer perceives the sub-images as a single complete image. In various embodiments, the light source 102 directs the light beam 112 toward image forming device 104. The image forming device 104 selectively modulates light beam 112 to generate an imaging light beam 114. By selectively modulating the light beam 112, the image forming device 104 generates the imaging light beam 114, which, when projected onto a surface, creates a focused sub-image that may form a portion of a full image. In certain embodiments, the spatial resolution of the sub-image is equal to the spatial resolution of the image forming device 104.

The optical system 106 is may be any combination of optical devices capable of controlling or directing the imaging light beam 114. In various embodiments, the optical system 106 may include one or more of mirrors, lenses, prisms, diffraction gratings, etc. The optical system 106 may sequentially emit a plurality of projection light beams 116A-H directed toward a projection surface 108. In certain embodiments, each of the projection light beams 116A-H corresponds to a sub-image region 110A-H of the projection surface 108. In one embodiment, the optical system 106 includes an array of fixed mirrors. In such an embodiment, each fixed mirror corresponds to and is focused toward a sub-image region 110A-H of the projection surface 108. In various embodiments, the image forming device 104 and/or the optical system 106 may direct the imaging light beam 114 toward a fixed mirror, which, in turn, directs a reflected beam (e.g., the projection light beam 116A) toward one or more sub-image regions (e.g. sub-image region 110A) of the projection surface 108. In some embodiments, the optical system 106 may include a mirror galvanometer for selectively modulating the imaging light beam 114 toward another optical element, such as a mirror in the array of fixed mirrors. In certain embodiments, the optical system 106 may include one or more lenses, collimating optical devices, and/or focusing devices, such as a converging lens. A collimating optical device may be used to focus the imaging light beam 114 at a desired location, such as a mirror galvanometer, or other optical device. In general, the optical system 106 may be any combination of optical devices capable of focusing, redirecting, or otherwise modifying the imaging light beam 114 to project a sub-image of a complete image at a projection surface.

Figure 2:
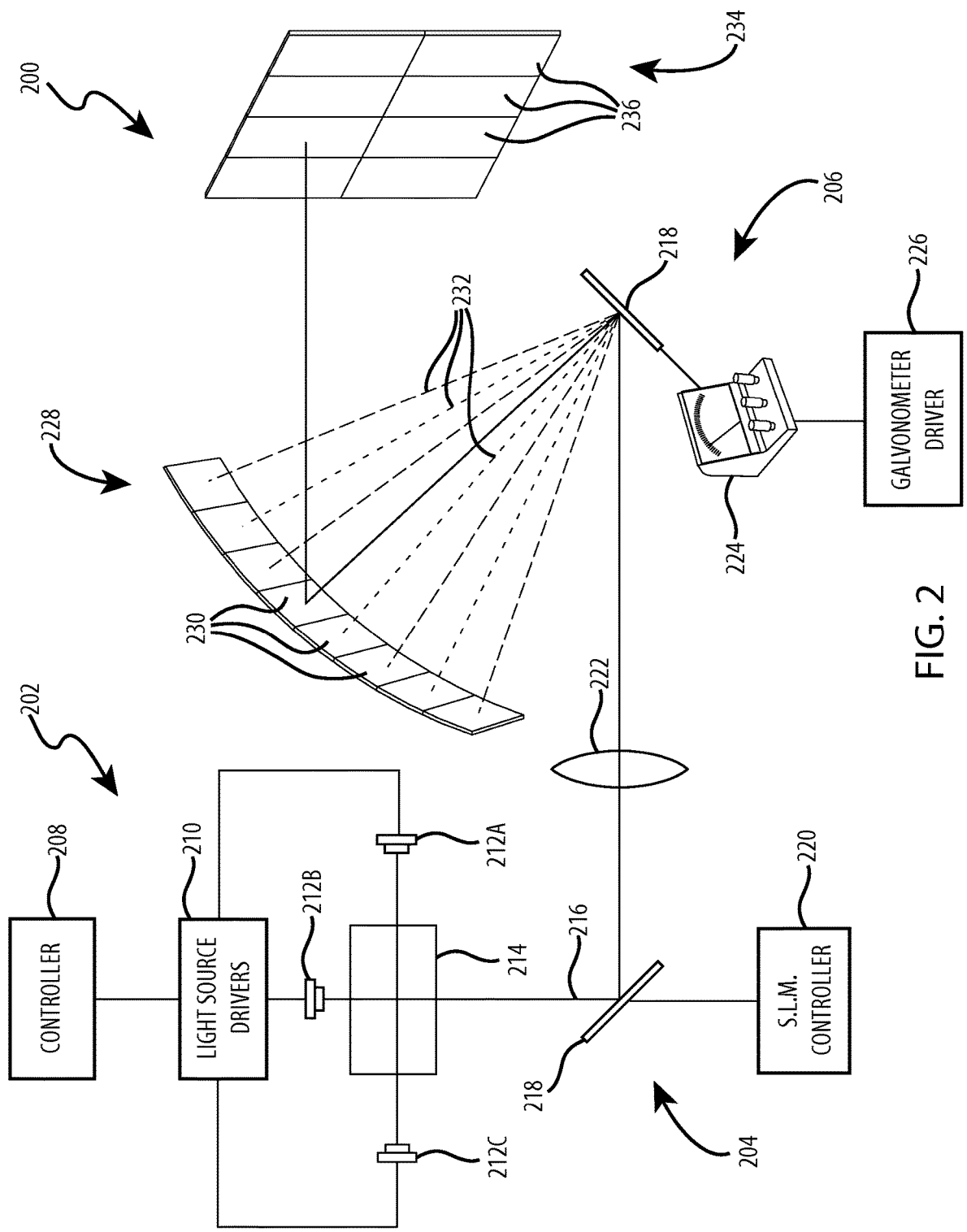
FIG. 2 is a system diagram of a first example of a projection system having a single light source.

A first example of the optical system 106 of FIG. 1 will now be discussed in more detail. FIG. 2 illustrates a system diagram of a projection system, generally designated 200, for field-sequentially improving the spatial resolution of a projected image. With reference to FIG. 2, the projection system 200 generally includes a light generation system 202, an image generation system 204, and an optical system 206. The light source 102 in this embodiment is the light generation system 202, which is a system for generating a single beam of light 216 for manipulation and image generation. As discussed in further detail below, the light generation system 202 may include one or more intensity-varied, colored light sources that may be combined into a single beam of composite light for image manipulation. The system 200 of FIG. 2 may also include an image forming device 104, which in this embodiment is an image generation system 204. This system 204 generates an image from an incident beam of light. The optical system 206 may be substantially similar to the optical system 106 of FIG. 1 and may generally include a configuration of optical components for directing the image generated by image generation system 204 toward a projection surface.

In the embodiment of FIG. 2, the light generation system 202 includes a controller 208, one or more light source drivers 210, a plurality of colored LEDs 212A, 212B, and 212C (or other light sources), and a prism 214. The controller 208 may be any device capable of controlling light source drivers 210. For example, the controller 208 may be a single-board microcontroller having one or more processing elements, such as a microprocessor, one or more input/output circuits, a clock generator, and memory such as random access memory (RAM), solid state memory, or the like, integrated into a single printed circuit board.

In other embodiments, the controller 208 may be a laptop computer, a tablet computer, a smartphone, or other programmable electronic device. The light source drivers 210 are power supply devices for controlling the light source, such as LEDs 212A, 212B, and 212C. In certain embodiments, the light source drivers 210 can vary the intensity of output of the light sources. In one embodiment, the light generation system 202 includes an light source driver 210 for each LED in light generation system 202. For example, LED 212A has a dedicated light source driver 210, LED 212B has a dedicated light source driver 210, etc. LEDs 212A, 212B, and 212C generate the light for projecting images. Although LEDs are used in this disclosure, one skilled in the art will appreciate that other types of light sources may be used and that the light source drivers may be varied as needed or may be omitted, depending on the type of light sources used.

In the embodiment of FIG. 2, three diode lasers are used. In this embodiment, each LED has a different color. For example, LED 212A may be red, LED 212B may be blue, and LED 212C may be green. In alternative embodiments, additional LEDs with additional colors may be used to increase the color gamut of the projection system 200. In the depicted embodiment, the prism 214 is an optical device for overlaying the outputs of LEDs 212A, 212B, and 212C to create a single composite beam 216. In various embodiments, the prism 214 may include one or more of a dichroic prism, a cross dichroic prism (X-cube), a Philips type prism, or any other optical element(s) capably of compiling the individual outputs of LEDs 212A, 212B, and 212C into composite beam 216.

In the embodiment of FIG. 2, the image generation system 204 includes an image forming device 218 and an image forming device controller 220. In the depicted embodiment, the image forming device 218 is a fast imaging device capable of manipulating composite beam 216 into an image with a fast refresh rate. In one embodiment, the image forming device 218 has a refresh rate of approximately 32 kHz. In other embodiments, the image forming device 218 may have any refresh rate sufficiently high to allow the projection system 200 to sequentially project a desired number of sub-images without perceptible lag or flickering in the projected image.

The image forming device 218 may undergo multiple iterations to produce a single frame of a motion picture. In the embodiment of FIG. 2, the image forming device 218 includes millions of microscopic mirrors arranged in a rectangular array. In a specific embodiment, each mirror is mounted on a yoke connected to two support posts by torsion hinges. Two pairs of electrodes may control the position of each mirror by electrostatic attraction. The image forming device 218 may further include a static random access memory (SRAM) (or other memory storage component) for each mirror onto which the charges to be applied to each electrode for moving the mirror may be stored. By sequentially loading and refreshing the SRAM, the mirrors can then be toggled on and off in a predetermined pattern. In various embodiments, each mirror in the image forming device 218 may correspond to one pixel in each sub-image on the projection surface. The imaging device controller 220 is a programmable computer device capable of controlling and manipulating the mirrors of image forming device 218 in order to generate the sub images.

In the embodiment FIG. 2, the optical system 206 includes a lens 222, a mirror galvanometer 224, a galvanometer driver 226, and a fixed mirror array 228, each of these elements will be discussed, in turn, below.

The lens 222 may be any optical element or combination of elements capable of receiving composite beam 216 from image forming device 218 and reducing composite beam 216 to a beam of minimal cross-section at mirror galvanometer 224. In various embodiments, the lens 222 may be a converging lens or a diffractive element for reducing composite beam 216 to a point and/or focusing the beam. Depending on the light source used and the desired output, in some embodiments the lens 222 may be omitted. However, often, the lens 222 may be desirable for efficiency purposes, specifically, the smaller a beam incident on the mirror galvanometer 224 the smaller the mirror surface to reflect the image may be and smaller mirrors may be rotated more quickly than a larger mirror as a result of a reduced moment of inertia. Therefore, by using a lens to reduce the diameter of the incident beam, the temporal efficiency may be improved by reducing the time required between successive sub images. In some embodiments, the lens 222 is a converging lens for focusing the composite beam 216 at the mirror galvanometer 224. In other embodiments, the lens 222 may be a diffractive element which creates a diffraction pattern, only a single peak of which is directed toward mirror galvanometer 224.

The mirror galvanometer 224 is an electromechanical instrument that rotates a mirror based on an applied electric current (or other type of signal). In the embodiment of FIG. 2, the mirror galvanometer 224 directs the composite beam received from the lens 222 toward a select mirror in fixed mirror array 228 along one of the optical paths 232. The galvanometer driver 226 is a programmable electronic device for supplying electrical current to the mirror galvanometer 224. In various embodiments, the galvanometer driver 226 may be clocked at the same rate as the refresh rate of the image forming device 218 to ensure that the mirror galvanometer 224 is moved appropriately to direct each sub-image received from the image forming device 218 at the corresponding mirror 230 in the fixed mirror array 228.

The fixed mirror array 228 is an arrangement of fixed mirrors 230 where each fixed mirror is configured to reflect light from the mirror galvanometer 224 toward a different area of the projection surface 234. In various embodiments, each of the mirrors 230 reflect sub-images of a composite image onto the projection surface 234. In such embodiments, the fixed mirrors 230 are arranged in mirror array 228 such that the projected sub-images images overlap by a designated number of pixels with adjacent sub-images. For example, a first sub-image may overlap by anywhere between 1 and 10 pixels with each adjacent sub image. However, in some embodiments, the images reflected by each of the mirrors may be positioned adjacent each other and may not overlap and may overlap by less than 1 pixel. In the embodiment of FIG. 2, eight fixed mirrors 230 are shown corresponding to eight sub-image regions 236 on projection surface 234. In other embodiments, different numbers and configurations of fixed mirrors 230 and sub-image regions 236 are possible without deviating from the scope of the present disclosure. For example, an alternative embodiment may have ten fixed mirrors 230 in fixed mirror array 228. The number of mirrors may depend on the desired projection image(s), as well as the size of the projection surface and characteristics of the various projection and imaging devices.

Figure 3:
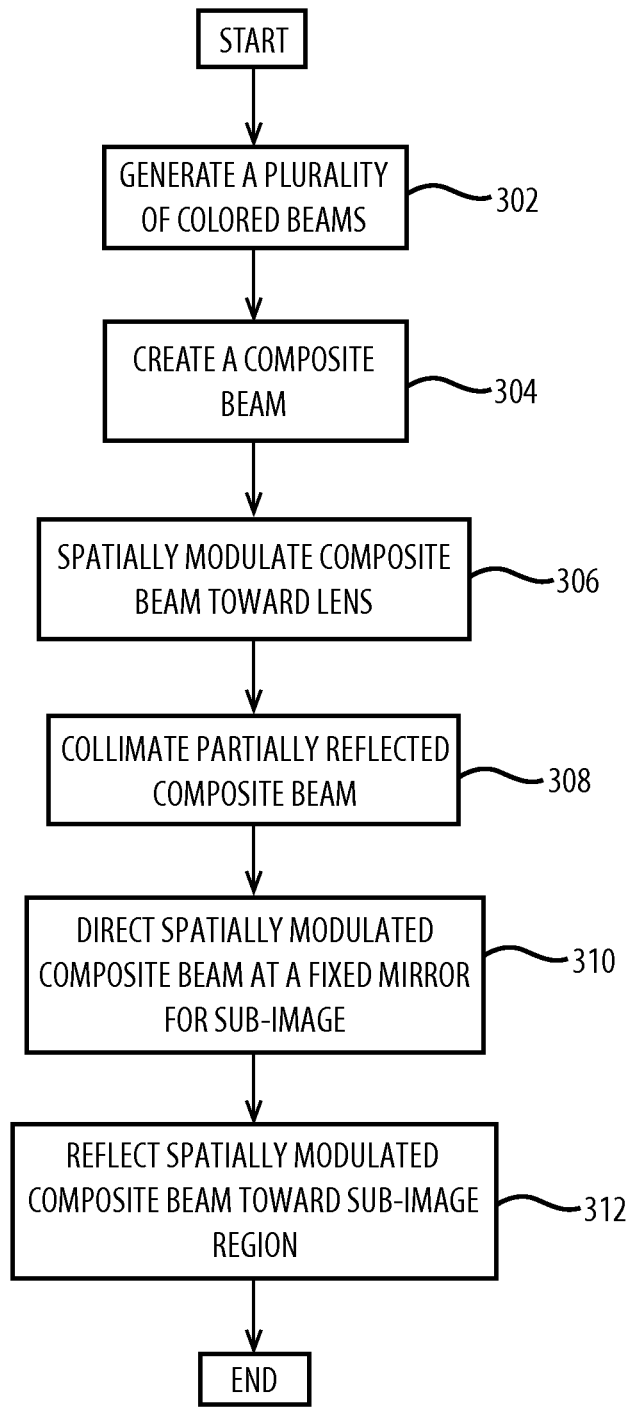
FIG. 3 is a flowchart illustrating a method for generating a projected image using the projection system of FIG. 1.

A method of using the system of FIGS. 1 and 2 for projecting images onto the projection surface will now be discussed. FIG. 3 is a flowchart for generating a projected image with field-sequentially improved spatial resolution using the projections system of FIGS. 1 and 2.

With reference to FIG. 3, the method 300 may being with operation 302. In operation 302, the LEDs 212A, 212B, and 212C (or other light sources) generate a plurality of colored light beams. The intensity of each of the LEDs 212A, 212B, and 212C may be determined by the controller 208 and the light source drivers 210. In operation 304, the prism 214 creates a composite beam by combining the plurality of colored beams into the composite beam 216.

In operation 306, the image forming device 218 partially reflects the composite beam 216 toward the lens 222 in that some of the light reaching the image forming device 218 may be reflected away from the lens 222 and the remaining portion of the light may be reflected towards the lens. In particular, the mirrors of image forming device 218 may be selectively toggled on or off so that the mirrors toggled on reflect an image toward the lens 222 and the mirrors toggled off direct part of composite beam 216 toward an absorber. The imaging device controller 220 configures image forming device 218 for a sub-image to be projected. In particular, the imaging device controller 220 transmits pixel information for the sub-image to image forming device 218 which electromechanically manipulates the microscopic mirrors into a binary representation of the sub-image. Only those micro-mirrors on image forming device 218 in the "on" position reflect composite beam 216 toward the lens 222. The micro-mirrors in the "off" position may reflect light from composite beam 216 toward an absorber, heat sink, or other direction away from the mirror array or projection surface.

The image forming device 218 may also partially reflect the composite beam 216 in anticipation of blending the first sub-image and a second sub-image at the location where they overlap in order to avoid the appearance of seams or keystone effect to the viewer. As will be appreciated by one skilled in the art, blending may take place in a number of different ways and using a number of mathematical models. In one embodiment, homographies may be used to calibrate the images by placing all of images into the same coordinate system. Once the images are placed in the same coordinate system, blending may be calculated using any appropriate blending function. For example, overlapping pixels may be adjusted to the average of their combined values. In other embodiments, the overlapping pixels may be subject to a linear blending function.

In yet other embodiments, the overlapping pixels may be blended using any appropriate blending means, calculation, or function. In general, the intensity of overlapping pixels in adjacent sub-images is modified by a factor between 0 and 1 such that when added together, the overlapping pixels have a combined intensity equal to that of non-overlapping pixels. In certain embodiments, the projection system 200 may include a digital camera to capture the projected sub-images. The projection system 200 may include a mechanism for projecting special markers onto the projection surface which the camera uses to create a reference between pixel coordinates of the projector and camera pixel coordinates. This reference may be expressed as a 3-by-3 matrix homography and may be calculated for each sub-image. Once the relationship between the sub-images is determined, the sub-images may be rectified and blended accordingly. In general, when blending is implemented, any given projected sub-image appears as an image with full brightness in the center of the image, and reduced brightness around the edges where overlap with a neighboring sub-image exists. To a viewer, the composite image appears as single image having smooth brightness effects because the reduced brightness of the overlapping portions of the sub-images appear to add together in the complete image.

In operation 308, the lens 222 collimates or narrows, the composite beam 216. As discussed above, reducing the cross-section of composite beam 216 reduces the necessary size of the mirror on mirror galvanometer 124 which improves the temporal resolution of projection system 200. In operation 308, mirror galvanometer 224 reflects the composite beam 216 toward a fixed mirror 230. The galvanometer driver 226 may configure the mirror galvanometer 224 to direct the composite beam 216 along an optical path 232 toward a select fixed mirror 230. In operation 312, the fixed mirror 230 reflects the composite beam 216 toward the desired sub-image region 236 of projection surface 234.

By sequentially generating different sub-images and projecting them to different sub-image regions 236 at a sufficiently high rate, the projection system 200 improves the spatial resolution by a linear factor by utilizing the spatial resolution of image forming device 218 multiple times for each composite image displayed on projection surface 234. In other words, by utilizing the temporal resolution of the projection system, the perceived spatial resolution for projected images is increased. As will be appreciated by one skilled in the art, the exposure time of the sub-images depends on a number factors including, but not limited to, the color depth of the projected image, the number of sub-images being projected, and/or the desired frame rate of projection. In one embodiment, a frame rate of 120 Hz may be used. However, other frame rates, both faster and slower, are possible without exceeding the scope of this disclosure. In conventional projection systems each pixel of the imaging device corresponds to exactly one pixel on the projection surface and therefore this type of increased spatial resolution is not feasible without a direct improvement to the native spatial resolution of the projection system.

The linear improvement in spatial resolution of the present disclosure scales with future improvements in both spatial resolution and temporal resolution of imaging devices, such as DMDs. Specifically, an increase in the spatial resolution of the imaging device improves the spatial resolution of each sub-image in the composite image. This improvement in the spatial resolution corresponds to an increase in the overall spatial resolution of the composite image by a factor of the number of sub-images in the composite image. Similarly, an improvement in the temporal resolution of the imaging device allows for the generation of more sub-images in any given composite image. The overall spatial resolution of the composite image improves with each additional sub-image because the spatial resolution each sub-image corresponds to the spatial resolution of the imaging device. That is, each pixel on the imaging corresponds to a smaller portion of the composite image, which equates to an overall increase in spatial resolution of the composite image. Therefore, because the projection system can utilize hardware improvements in both temporal and spatial resolution to adjust the perceived spatial resolution of projected images, increases in both resolution categories (time and space) will compound to increase the projected image resolution.

Figure 4:
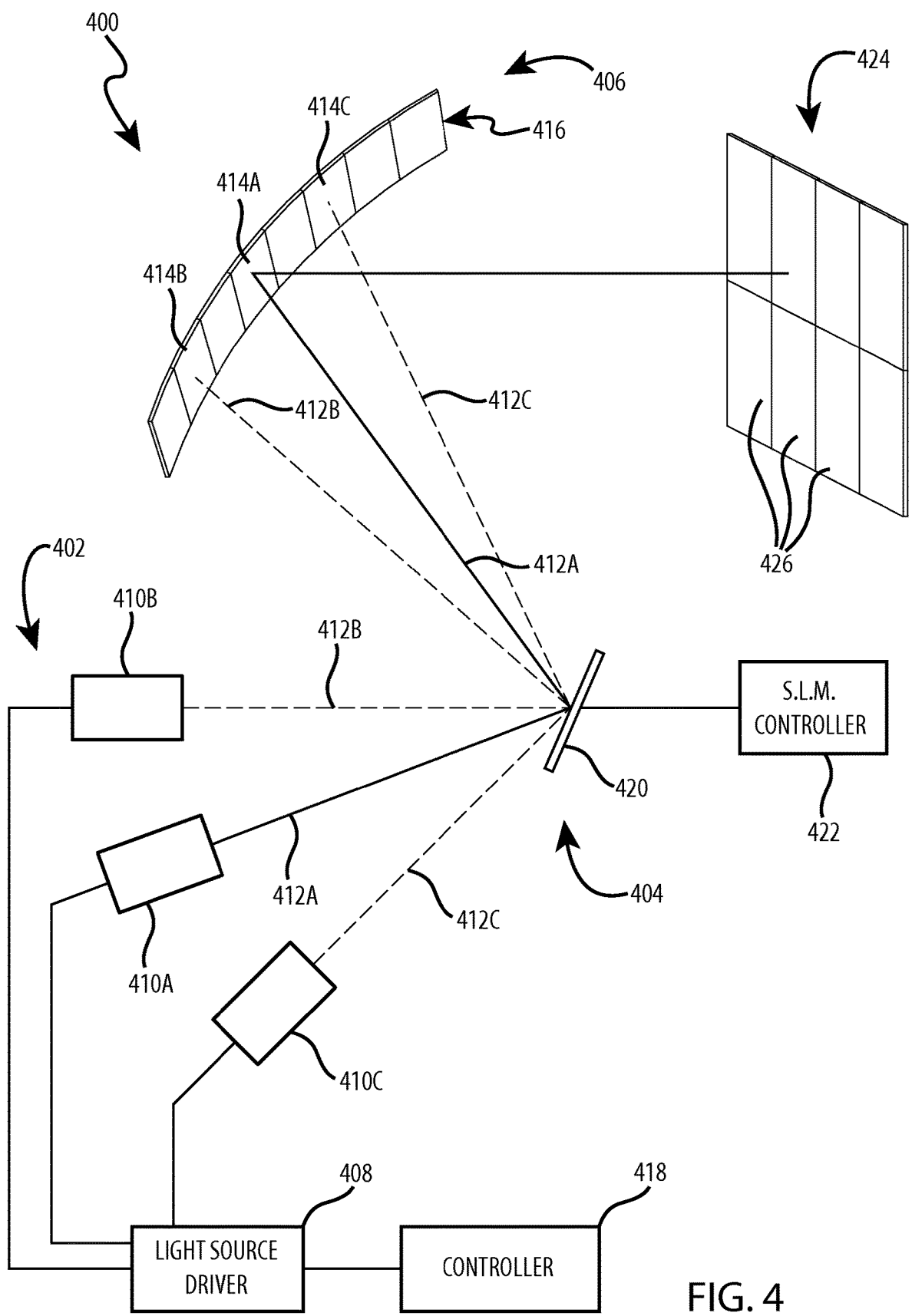
FIG. 4 is a system diagram of a projection system having two or more light sources.

A second example of the projection system of FIG. 1 will now be discussed in more detail. FIG. 4 depicts a functional block diagram of a multiple light source projection system, generally designated 400, for field-sequentially improving the spatial resolution of a projected image. The projection system 400 of FIG. 4 may be somewhat similar to the projection system of FIG. 2, but may include multiple light sources that direct light to an imaging controller 422.

With reference to FIG. 4, the projection system 400 generally includes a laser array system 402, an image generation system 404, and an optical system 406. The laser array system includes an electro-optical system for sequentially generating beams of laser light from an array of multiple lasers. The laser array system 402 may be implemented as light source 102 in FIG. 1. The image generation system 404 includes an optical system for selectively modulating light directed from laser array system 402 in order to form a portion of an image. The image generation system 404 may be implemented as image forming device 104 of FIG. 1. The optical system 406 may include an array of fixed mirrors for reflecting light received from image generation system 404 and directing the light toward projection surface 424. In other embodiments, the optical system 406 may include an array of lenses or other optical elements in addition to or instead of the fixed mirror array 416

In the embodiment of FIG. 4, laser array system 402 includes a controller 418, a laser driver 408, and one or more laser towers 410A, 4106, and 410C. As discussed above with respect to controller 208 in FIG. 2, controller 418 may be any device capable of controlling laser driver 408. For example, controller 418 may be a single-board microcontroller having a microprocessor, input/output circuits, clock generator, and RAM integrated into a single printed circuit board. Alternatively, controller 418 may be a personal computer, a tablet computer, a smart phone, or any other programmable electronic device.

In the embodiment of FIG. 4, laser driver 408 is an electro-optical system capable of controlling the output of laser towers 410A, 4106, and 410C. One possible configuration of laser driver 408 is shown in the circuit diagram depicted in FIG. 5. The laser driver 408 may activate individual lasers within the laser towers 410A, 4106, and 410C in a predetermined order to progressively build the tiles of the projected image (See FIG. 6). In general, the laser driver 408 is an electrical circuit for selectively activating and deactivating individual lasers arranged in the laser array system 402 sequentially in order to generate laser beams of differing color incident on the imaging device 420.

Figure 5:
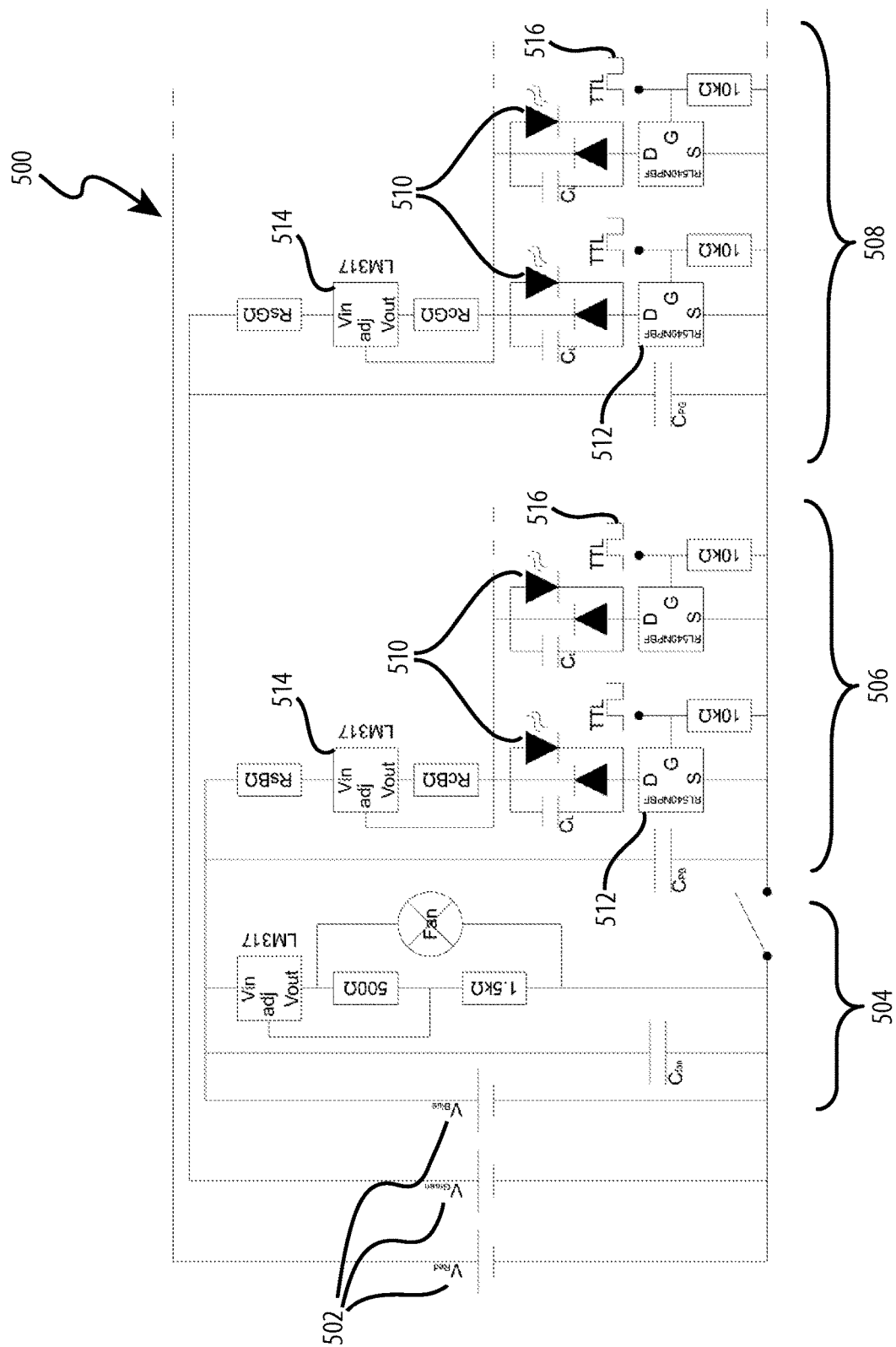
FIG. 5 is an example of a simplified circuit diagram for a laser driver that may be used with the projection system.

An exemplary circuit for the laser driver, which may be similar to the laser driver of FIG. 4, will now be discussed. FIG. 5 depicts a partial circuit diagram detailing a laser driver 500 for driving the lasers included in a laser tower (e.g., laser tower 310A). With reference to FIG. 5, the laser driver 500 may generally include one or more voltage sources 502, a fan branch 504, a blue laser branch 506, and a green laser branch 508. In various embodiments, such as the three laser embodiment described below, the laser driver 500 may further include a red laser branch (not shown) which may be analogous to the blue laser branch 506 and the green laser branch 408, saving the color of the laser diode employed (red versus blue). In various embodiments, other color primaries in than the traditional RGB may be used. Additionally, more than three primary colors may be used in order to improve the color depth of the projected image.

In the embodiment of FIG. 5, the voltage sources 502 provide power to the various other components and circuits included within the laser driver 500 including, but not limited to, the fan branch 504, the blue laser branch 506, and the green laser branch 508. In the depicted embodiment, each of the branches has its own dedicated voltage source 502 because of the varying requirements of the branches. Specifically, the voltage of each voltage source 502 may depend on various factors, such as the power output and frequency of the laser diodes 510. In the depicted embodiment, one of the voltage sources 502 powers fan branch 504 which activates a cooling fan for one or more of the other laser branches (e.g., blue laser branch 506). However, it should be noted that in other embodiments, the various drivers may share voltage sources.

The blue laser branch 506 is generally a sub-circuit of the laser driver 500 configured to selectively activate a single laser diode 510. The blue laser branch 506 includes a current limiter circuit 514 to ensure that the laser diode 510 does not become overloaded and fail. The blue laser branch 506 may further include a transistor 512, such as a metal-oxide-semiconductor field-effect-transistor (MOSFET), connected to an input signal 516 for selectively closing and opening the transistor gate and activating/deactivating laser diode 510. As will be appreciated by one skilled in the art, other electrical components may be used to limit power, current, voltage, and other electrical factors that may result in decreased performance or failure of the laser driver 500 and/or the laser diode 510. As shown in FIG. 5, the blue laser branch 506 and the green laser branch 508 include similar components. Therefore, the description of the components in the blue laser branch 406 applies with equal force to the components of the green laser branch 508.

Referring again to FIG. 4, the laser towers 410A, 410B, and 410C may include, for example, arrays of diode lasers of differing output frequency. In other embodiments, other types of light emitters may be used. In one embodiment, the emission area of the light source is minimized (as close to a point source as possible) in order to render the projected image in focus at any distance. In one embodiment, the lasers within each of the laser towers 410A, 4108, and 410C have output frequencies corresponding to typical component colors such as red, green, and blue. According to certain embodiments, the laser towers 410A, 4108, and 410C may include three or more lasers vertically arranged within a housing. Each laser diode may be mounted on a fan-cooled heat sink to prevent overheating. Each laser may have associated focusing optics, such as a concave mirror for focusing laser light on a narrow opening (e.g., a pin hole) in the tower housing. Such a configuration ensures both that the laser light covers the entirety of the imaging device 420 and also creates a diverging beam of light which reduces the risk of eye injury. Additional towers may be used to increase the spatial resolution of the projected image. In such embodiments, each tower may correspond to a single sub-image region 426 of the projection surface 424. That is, each tower includes the necessary components to produce a sequence of full-color sub-images. Each of the laser towers 410A, 4108, and 410C respectively outputs beams 412A, 4128, and 412C directed at the imaging device 420.

In the embodiment of FIG. 4, image generation system 404 includes the imaging device 420 and the imaging device controller 422. As discussed above, the imaging device 420 may a fast imaging device composed of millions of microscopic mirrors for generating a binary representation of a sub-image. The imaging device 420 selectively modulates beams 412A, 4128, and 412C toward the optical system 406. The imaging device controller 422 provides the input signal to the imaging device 420 to construct the binary representation of the sub-image. In various embodiments, the imaging device controller 422 provide a sequence of input signals to the imaging device 420 that, when produced sequentially by the imaging device 420, result in a greyscale representation of a sub-image. This process may be repeated for each component color (i.e., each laser in a given laser tower) so that the greyscale for each component color may be overlaid on sub-image region 426 to create a complete image on projection surface 424.

In the embodiment of FIG. 4, the optical system 406 includes the fixed mirror array 416. In the depicted embodiment, the fixed mirror array 416 comprises a plurality of fixed mirrors including fixed mirrors 414A, 414B, and 414C. Each fixed mirror in fixed mirror array 416 is oriented to direct light reflected from imaging device 420 toward a sub-image region 426 on the projection surface 424. In various embodiments, one fixed mirror (e.g., one of fixed mirrors 414A, 414B, and 414C) corresponds to one laser tower (e.g., laser towers 410A, 410B, and 410C). For example, laser tower 410A may exclusively reflect light off of imaging device 422 toward fixed mirror 414A; laser tower 410B may exclusively reflect light off of imaging device 420 toward fixed mirror 414A; etc. In such an embodiment, each laser tower (e.g., laser tower 410A) generates a single sub-image of the composite image projected onto projection surface 424.

It should be noted that the systems of FIGS. 2 and 4 may also be used to overlap projected sub-images in order to create increased pixel density in areas of interest. For example, one of the fixed mirrors may direct a particular sub-image to overlap two adjacent sub-images at the board of the adjacent sub-images. The particular sub image may have an altered magnification (e.g., magnified/demagnified) to increase or decrease the pixel density (pixels per unit area) within the region without increasing the resolution of any of the particular sub-images. Therefore, this mechanism may be used to increase the apparent resolution of the projected image without modifying the actual resolution of the imaging device. Overlapping images may be calibrated in order to smoothly blend the images so that a viewer is unable to detect the means by which the apparent increase in resolution occurs.

Figure 6:
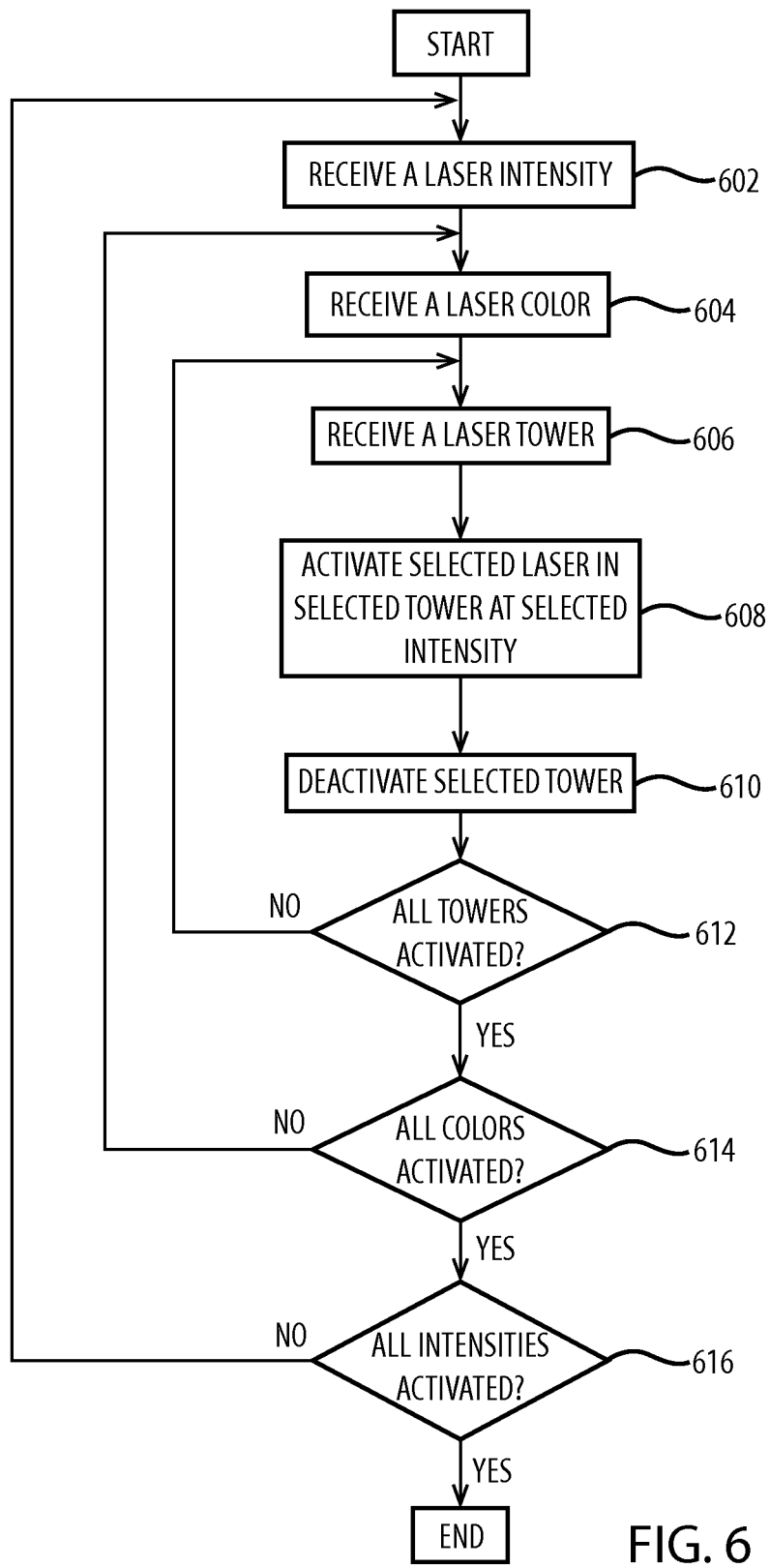
FIG. 6 is a flowchart illustrating a method for selectively activating lasers within laser towers.

FIG. 6 is a flowchart describing operational steps for selectively activating lasers within a laser tower, such as laser tower 410A. With reference to FIG. 6, in operation 602, the controller 418 transmits a selected laser intensity to the laser driver 408. The selected intensity may include a first intensity for each of the lasers within the laser array system 402. In various embodiments, the received intensity determines a component intensity for each color displayed using the projection system 400. In certain embodiments, the laser array system 400 iterates through each laser in each tower at a first intensity before repeating the iteration at a second intensity, as detailed below. As will be appreciated by one skilled in the art, by sequentially overlaying multiple intensities from multiple colors, an image containing colors that entirely or completely cover the visible range can be generated in order to form a full color image.

In operation 604, the controller 418 transmits a selected laser color to the laser driver 408. In certain embodiments, the laser array system 402 iterates through a single component color of the final image in each of the laser towers 410A, 4106, and 410C prior to moving on to a subsequent color. For example, in an embodiment where each laser tower includes three component colors (e.g., red, blue, and green), the laser driver 408 may receive instructions for a single component color at a time. The laser driver 408 may then activate each laser of the received component color within laser array system 402 before moving on to a subsequent component color.

In operation 606, the controller 418 transmits data corresponding to a selected laser tower (e.g., laser tower 410) to activate to the laser driver 408 for the selected tower. In the embodiment depicted in FIG. 4, three laser towers are shown, however, in other embodiments, any number of laser towers may be used so long as the temporal resolution of imaging device 420 will support an additional sub-image (i.e., enough unused imaging device cycles exist to allow for the generation of an additional full resolution sub-image without perceptible lag or flickering in the final projected image). In various embodiments, the laser driver 408 activates a single laser in a single laser tower at a single intensity. Therefore, in operation 606 the controller 418 indicates the selection of the one laser tower to be activated for the given iteration.

In operation 608, the laser driver 408 activates the selected laser in the selected laser tower at the selected intensity. The intensity of the laser may be adjusted by altering the input voltage to the laser diode (e.g., laser diode 510 in FIG. 5) or by modifying the pulse width of the signal to the laser diode (e.g., input signal 516 in FIG. 5). In various embodiments, the pulse width of the input signal 516 may be synchronized with the binary image generated by the imaging device 420 to ensure that the laser light is reflected for the correct duration. In operation 610, the laser driver 408 deactivates the selected laser tower.

In decision block 612, the controller 418 determines whether all of the laser towers have been cycled through. If the controller 418 determines that all of the laser towers have not been cycled through (decision block 612, NO branch), then the controller 418 will transmit a new laser tower to laser driver 408 in operation 606. If the controller 418 determines that all of the laser towers have been cycled through (decision block 512, YES branch), then the controller 418 determines whether all laser colors have been activated in decision block 614. If the controller 418 determines that not all laser colors have been activated (decision block 614, NO branch), then the controller 418 selects a new laser color in operation 604. If the controller 418 determines that each laser color has been activated (decision block 614, YES branch), then the controller 418 determines whether all intensities have been activated in decision block 616. As used herein, "all intensities" means all intensities within a selected set of intensity values. If the controller 418 determines that not all intensities have been activated (decision block 616, NO branch), then the controller 418 selects a new intensity within the set of intensities in operation 602. If the controller 418 determines that all intensities have been activated (decision block 616, YES branch), then the method terminates for the given projected image. In various embodiments, each projected image corresponds to a single frame for a motion picture. As will be appreciated by one skilled in the art, repeating the method of FIG. 6 at a sufficiently high refresh rate that will result in a series of projected images that appear to a human observer as depicting continuous motion.

Figure 7:
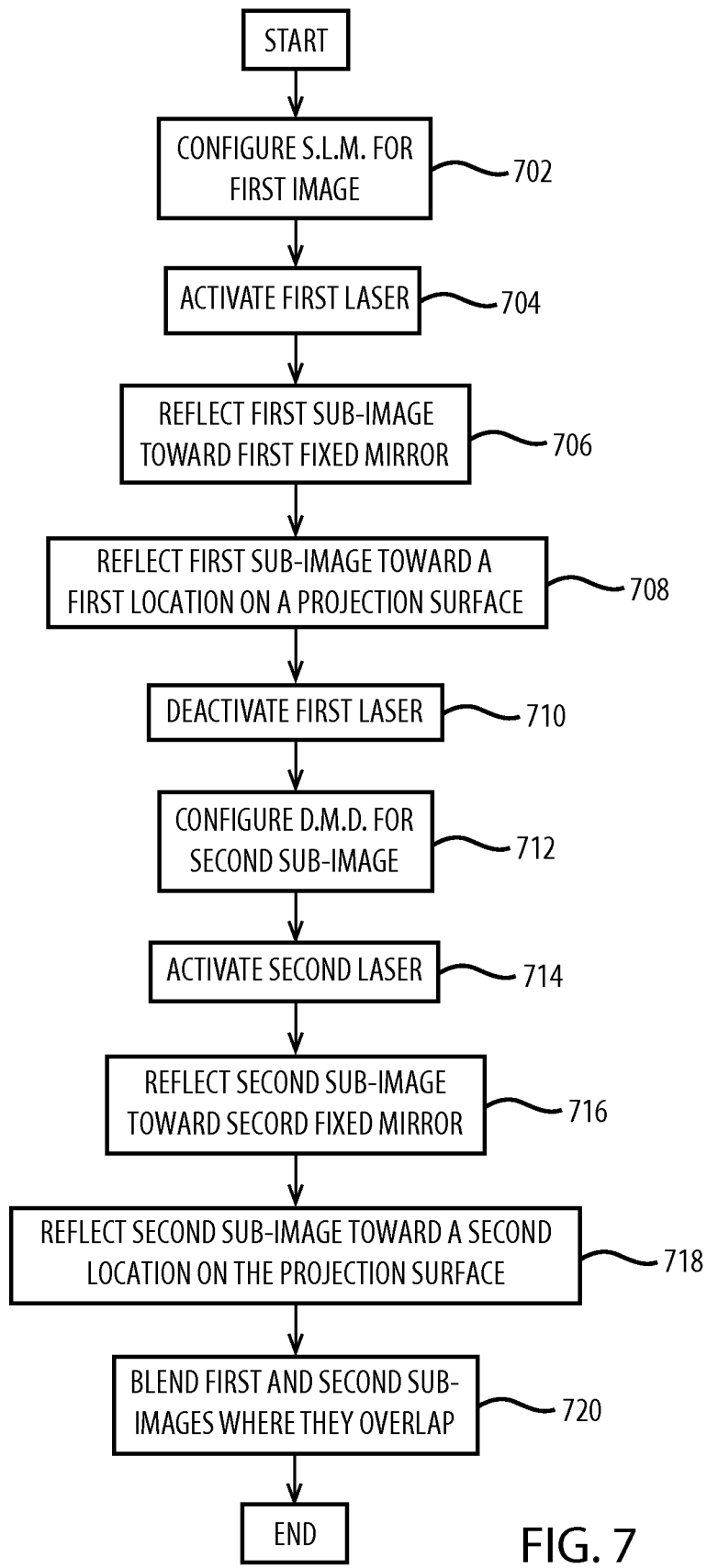
FIG. 7 is a flowchart illustrating a method for projecting an image using the projection system of FIG. 3.

A method for using the system of FIG. 4 to project images onto the projection surface will now be discussed. FIG. 7 is a flowchart depicting operational steps for generating a projected image with field-sequentially improved spatial resolution using the projections system of FIG. 4. For simplicity, FIG. 7 depicts a two sub-image system. However, those skilled in the art would appreciate that the following method can be extrapolated to any number of sub images.

With reference to FIG. 7, the method may begin with operation 702. In operation 702, the imaging device controller 422 configures the imaging device 420 for a first sub image. For example, the imaging device controller 422 may selectively move the microscopic mirrors in imaging device 420 in order to generate a binary image of pixels for a single sub-image. In certain embodiments, the image configured on the imaging device 420 also corresponds to a single laser in a single laser tower at a single intensity as described in FIG. 6.

In operation 704, the laser driver 408 activates a first laser directed at the imaging device 420. For example, the laser driver 408 activates the first laser in response to instructions received from the controller 418 as described in FIG. 6. In operation 706, the imaging device 420 reflects the first laser light toward a first fixed mirror. In various embodiments, the reflected light typically includes component light of a single color and a single intensity for a single sub-image. In such embodiments, the light reflected from the imaging device 420 includes a binary representation of a single sub-image for a single color at a single intensity. In operation 708, a fixed mirror, (e.g., fixed mirror 414A) reflects the incident beam (e.g., 412A) toward a first sub-image region 426 in projection surface 424. In operation 710, controller 420 and laser driver 408 deactivate the first laser.

In operation 712, the imaging device controller 422 configures the imaging device 420 for a second sub-image. The imaging device controller 422 performs this operation in the same manner as described above with respect to operation 702. Similarly, in operation 714, the laser driver 408 activates a second laser (e.g., one of the lasers in laser tower 410B) directed at the imaging device 420. As described above with respect to FIG. 6, the second laser may be a laser having the same output color as the first laser and having the same intensity. In operation 716, the imaging device 420 selectively modulates a second sub-image toward a second fixed mirror (e.g., fixed mirror 414B). In various embodiments, the second sub-image reflected represents a binary representation of a portion of the complete representation for a single color laser emitting at a specified intensity. In operation 718, the fixed mirror 414B reflects the second sub-image toward the projection surface 424 so that the second sub-image is adjacent to and partially overlapping the location of the first sub-image. In one embodiment, the first and second sub-images overlap by a single pixel. In other embodiments, the first and second sub-images overlap by up to 10 pixels. In yet other embodiments, the first and second sub-images overlap by more than 10 pixels.

In operation 720, the projection system 400 calibrates and blends the first and second sub-images at the location where they overlap in order to avoid the appearance of seams or keystone effect to the viewer. As will be appreciated by one skilled in the art, blending may take place in a number of different ways and using a number of mathematical models. In one embodiment, homographies may be used to calibrate the images by placing all of images into the same coordinate system. Once the images are placed in the same coordinate system, blending may be calculated using any appropriate blending function. For example, overlapping pixels may be adjusted to the average of their combined values. In other embodiments, the overlapping pixels may be subject to a linear blending function. In yet other embodiments, the overlapping pixels may be blended using any appropriate blending means, calculation, or function. In general, the intensity of overlapping pixels in adjacent sub-images is modified by a factor between 0 and 1 such that when added together, the overlapping pixels have a combined intensity equal to that of non-overlapping pixels. In certain embodiments, the projection system 300 may include a digital camera to capture the projected sub-images. The projection system 400 may include a mechanism for projecting special markers onto the projection surface which the camera uses to create a reference between pixel coordinates of the projector and camera pixel coordinates. This reference may be expressed as a 3-by-3 matrix homography and may be calculated for each sub-image. Once the relationship between the sub-images is determined, the sub-images may be rectified and blended accordingly.

By performing the operations of FIGS. 6 and 7 in an iterative manner, projection system 400 generates a projected image with improved spatial resolution by utilizing the full spatial resolution of imaging device 420 to generate only a portion of the projected image at a time. Fast switching between laser colors and projection location creates the appearance of a single, smooth image to observers from both near and far observation distances. The speed at which imaging device 420 can switch pixels on and off allows for this increase in spatial resolution of projected images.

Figure 8A:
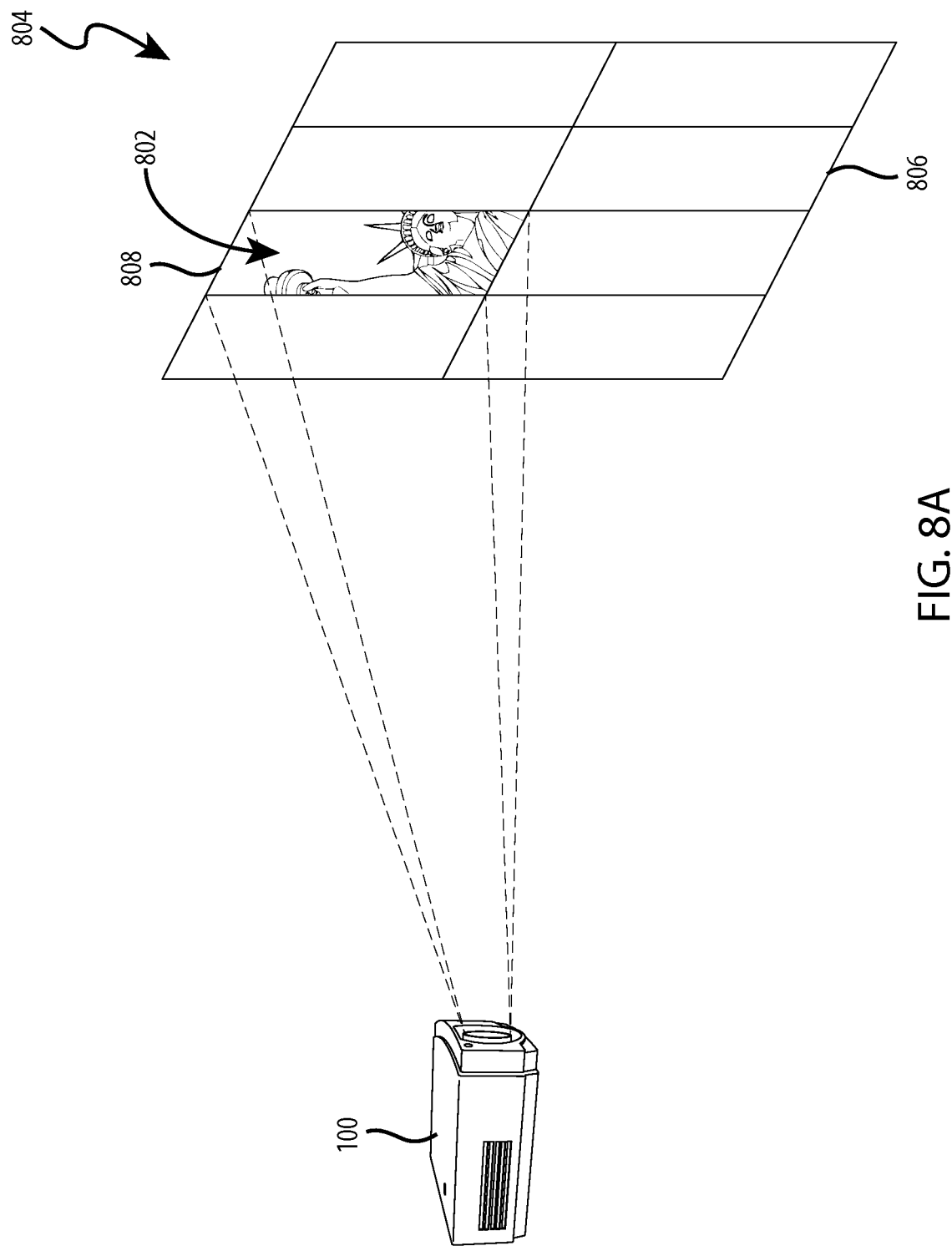
FIG. 8A is a perspective view of a first sub-image of a projected image as projected by the projection system at a first point in time.
Figure 8B:
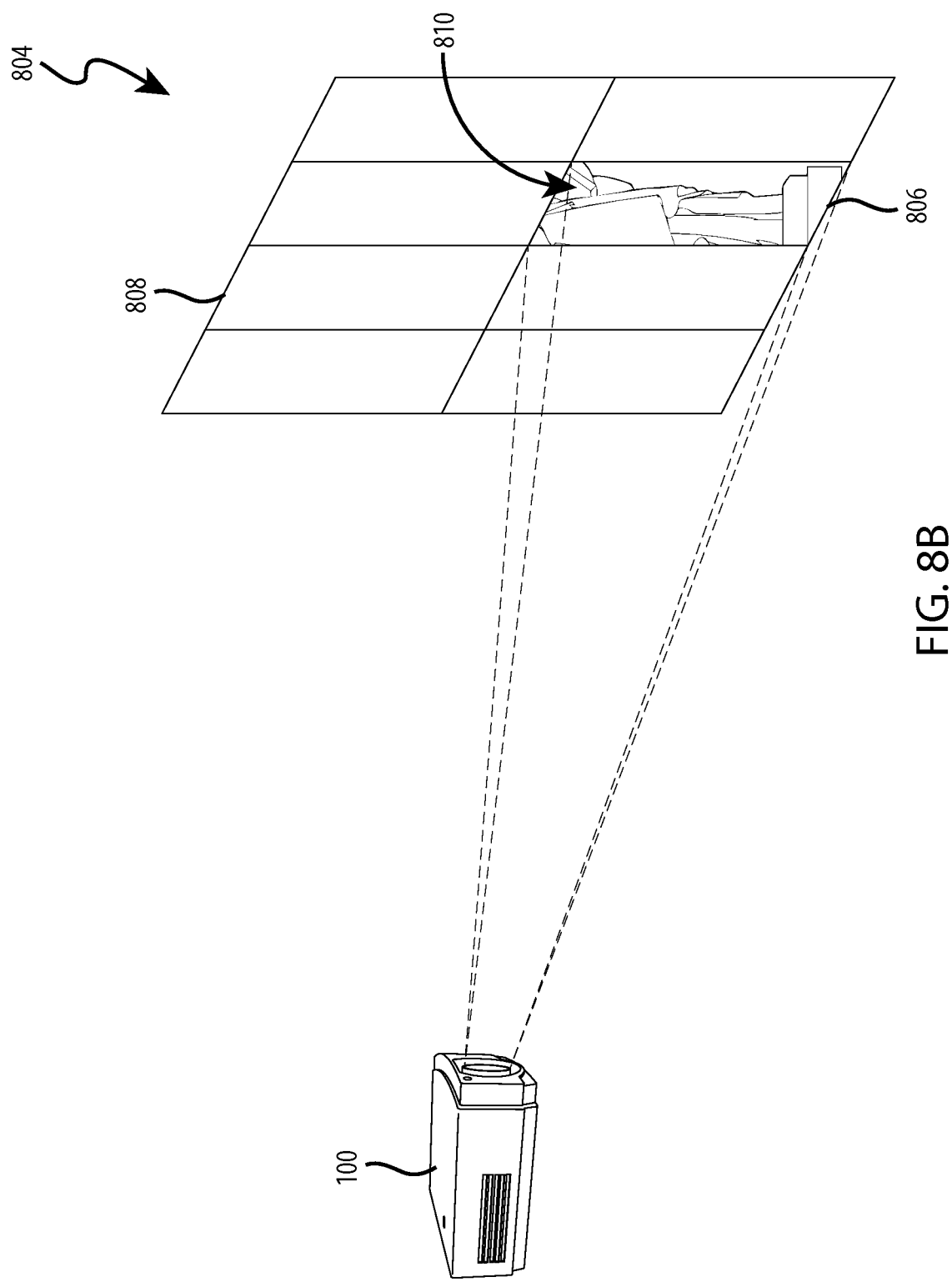
FIG. 8B is a perspective view of a second sub-image of the projected image of FIG. 7A as projected by the projection system at a second point in time.
Figure 8C:
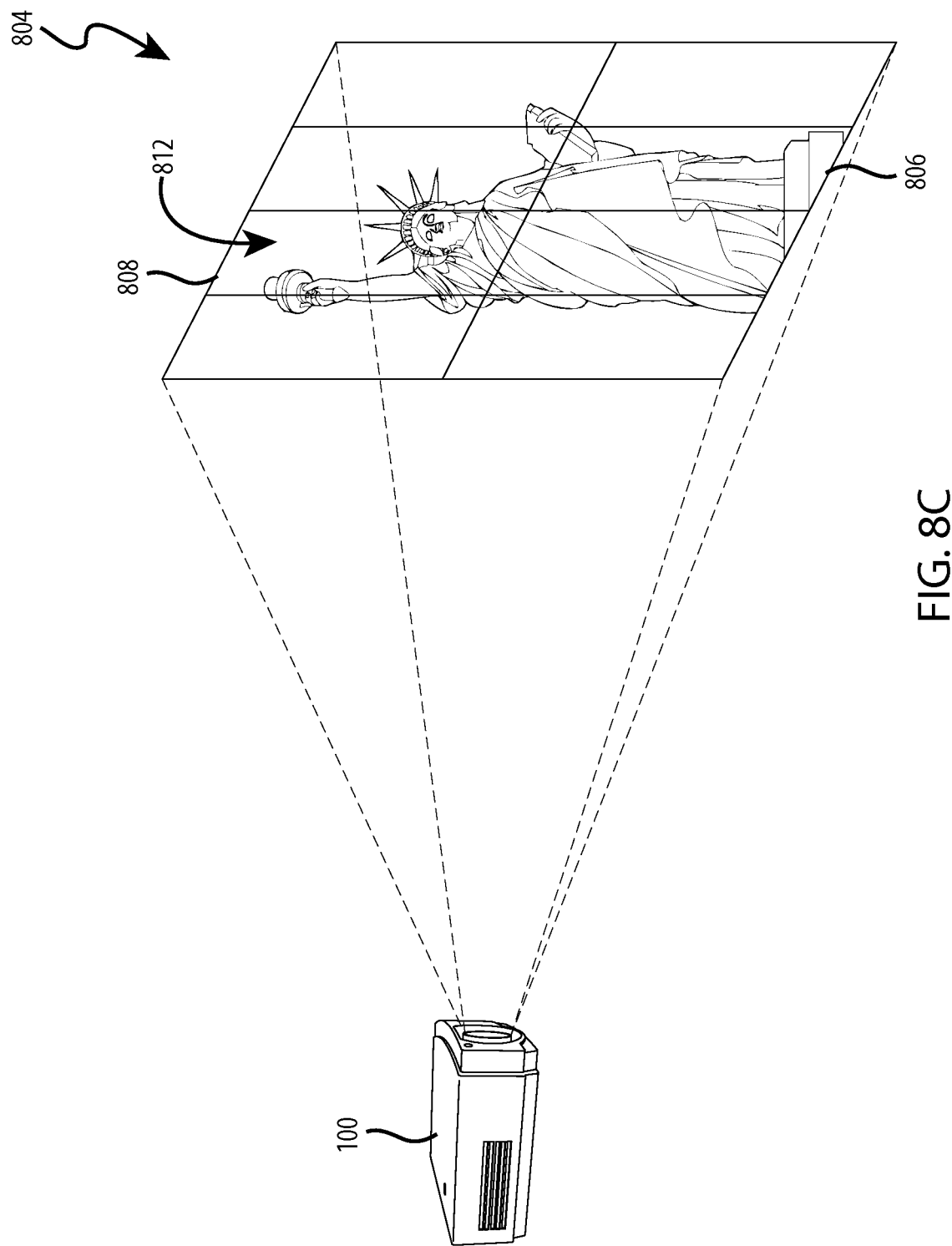
FIG. 8C is a perspective view of the projected image of FIG. 8A as perceived by a viewer.

Illustrative projection images using the system of FIGS. 1, 2, and/or 4 will now be discussed. FIGS. 8A and 8B depict projected sub-images of a projected image at different points in time, in accordance with an embodiment of the present invention. FIG. 8C illustrates a perspective view of the projected image 812 as perceived by a viewer. With reference to FIG. 8A, the projector system 100 projects sub-image 802 onto sub-image region 808 of projection surface 704. As discussed with respect to the methods of FIGS. 3 and 7, the light forming the sub image may be directed in various manners towards the respective sub image region 808 and may optionally overlap with adjacent sub-image regions. After the first sub image is projected onto the projection surface, a second sub image may then be projected onto the projection surface. FIG. 8B illustrates the projector system 100 projecting another sub-image 810 onto another sub-image region 806 of projection surface 804. In other words, the second sub image 810 is projected onto the second sub region 808 after the first sub image 802 has been projected onto the first sub region 808. It should be noted that the sequence in which sub images are projected onto the projection surface may be varied as desired. For example, in some instances the next projected sub image may be the image to be projected onto the sub region adjacent to (horizontally or vertically) the current sub region being projected onto. Alternatively, the projection order for the sub regions may be otherwise varied, random, or the like. The sequence may depend on the images to be projected, the characteristics of the projection system, or other factors. Sub-images may be projected sequentially or interleaved as described above with respect to FIG. 6.

As discussed above, repeating the projection process at a sufficiently high refresh rate creates the appearance of smooth motion at a spatial resolution that is a multiple higher than the spatial resolution of the imaging device alone. FIG. 8C is a perspective view of the projected image 812 of FIGS. 8A and 8B, as perceived by a viewer. With reference to FIG. 8C, the projected image of FIG. 8C is a single frame of a motion picture or may be a still image or the like. As shown in FIG. 8C, the complete projected image 812 may appear as a single composite of each of the sub images 802, 810, even though the sub images may not be displayed at the same time on the projection surface. In addition to the sub images being viewed as being displayed at the same time to the viewer, the boundaries between each sub image are blended so as to be hidden from a viewer. In particular, because the viewer perceives each sub image as being displayed simultaneously with the other images (due to the characteristics of the human eye), the system also adjusts for the overlap at boundaries in the sub images that could be viewed by the viewer if not corrected/adjusted. By rapidly displaying each sub image and accounting for the transitions and overlap between each of the sub images, the viewer may view each complete projected image or frame as a single image. As each of the sub images may exploit the full spatial resolution of the projection system, the combined or full image may have an increased spatial resolution as compared to an instance where the full image is projected using one projection region. This allows the projection system to have a modified spatial resolution without requiring a change in hardware or component characteristics.

Focusing Array

In some instances, the projection systems of FIGS. 2 and 4 may result in certain imaging artifacts appearing in the projected image. In particular, certain characteristics of the projector resulted in diffractive ringing around sharp edges in the image, as well as multiple image shadows, likely due to the diffraction of the laser on the projection surface. Accordingly, in some implementations, a lens array or other focusing system may be used with the projection systems to reimage the modulated light onto the projection surface, rather than the light being directly projected onto and expanding to the projection surface. The focusing array may be positioned between the image forming device and the projection surface and may reimage or otherwise modified the modulated light into a titled array on the projection surface. As will be discussed below, the configuration of the focusing array and configuration of light as it hits the focusing array may be varied as desired to create a select projection output. The focusing array may be used to create a full color image for each direction of light, which allows light sources, such as lasers, of multiple wavelengths, including not just red, green, and blue wavelengths.

Figure 9:
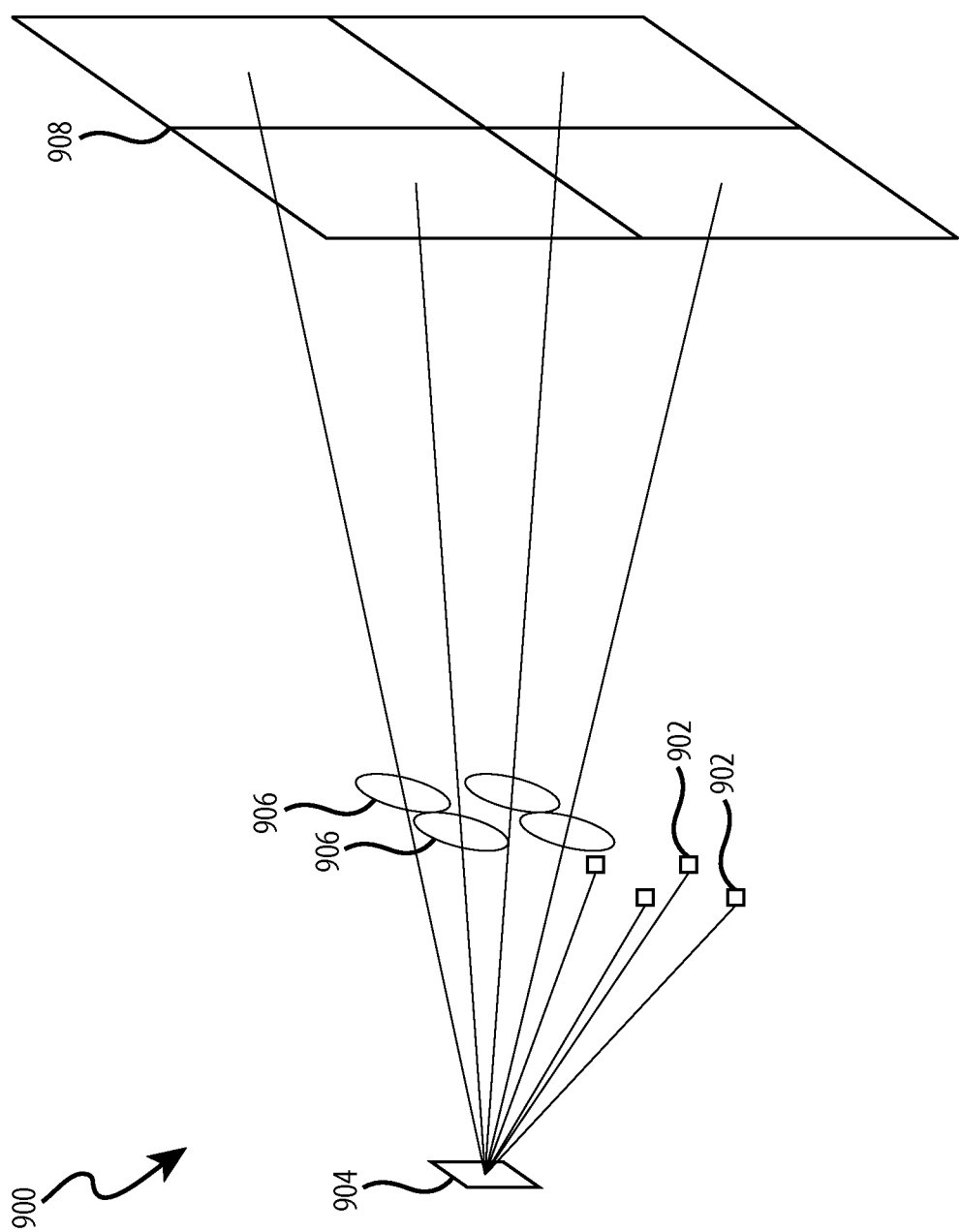
FIG. 9 is a perspective view of a projection system for field sequentially improving the spatial resolution of a projected image with an output lens array.

An example of a projection system including a focusing array will now be discussed in more detail. FIG. 9 depicts a projection system, generally designated 900, for field sequentially improving the spatial resolution of a projected image with an output lens array. The projection system 900 generally includes a plurality of light sources 902, a spatial light modulator 904, a plurality of focusing lenses 906, and a projection surface 908. The light sources 902 may be any light emitting device as described above with respect to FIGS. 1-8, such as an LED, a laser, a laser diode, a quantum dot, or any other appropriate light emitting device. Spatial light modulator 904 may be any fast image forming device as described above with respect to FIGS. 1-8. The focusing lenses 906 may be any appropriate focusing device or devices for re-imaging a spatially modulated light beam and eliminating any diffractive effects from the spatial light modulator 904. For example, the focusing lenses 906 or focusing array may be one or more convex lenses. In various embodiments, there may be one focusing lens 906 for each light source 902. In other embodiments, there may be one focusing lens 906 that may be adjusted in order to direct light toward the correct region of the projection surface 908. The focusing lenses 902 and light sources 902 may be positioned such that light emitted by a single light source 902 is modulated by the spatial light modulator 904 and directed toward a single focusing lens 906, which focuses a sub-image on a portion of the projection surface 908. The light sources 902 and the focusing lenses 906 may be arranged such that a plurality of sub-images may be sequentially projected onto the projection surface 908 adjacent to one another and with a desired amount of sub-image overlap. The implementation of focusing lenses 906 may be used to reduce or eliminate diffractive effects of the spatial light modulator 904 and/or other optical elements in the projection system 900, which as discussed above can create image artifacts.

Figure 10:
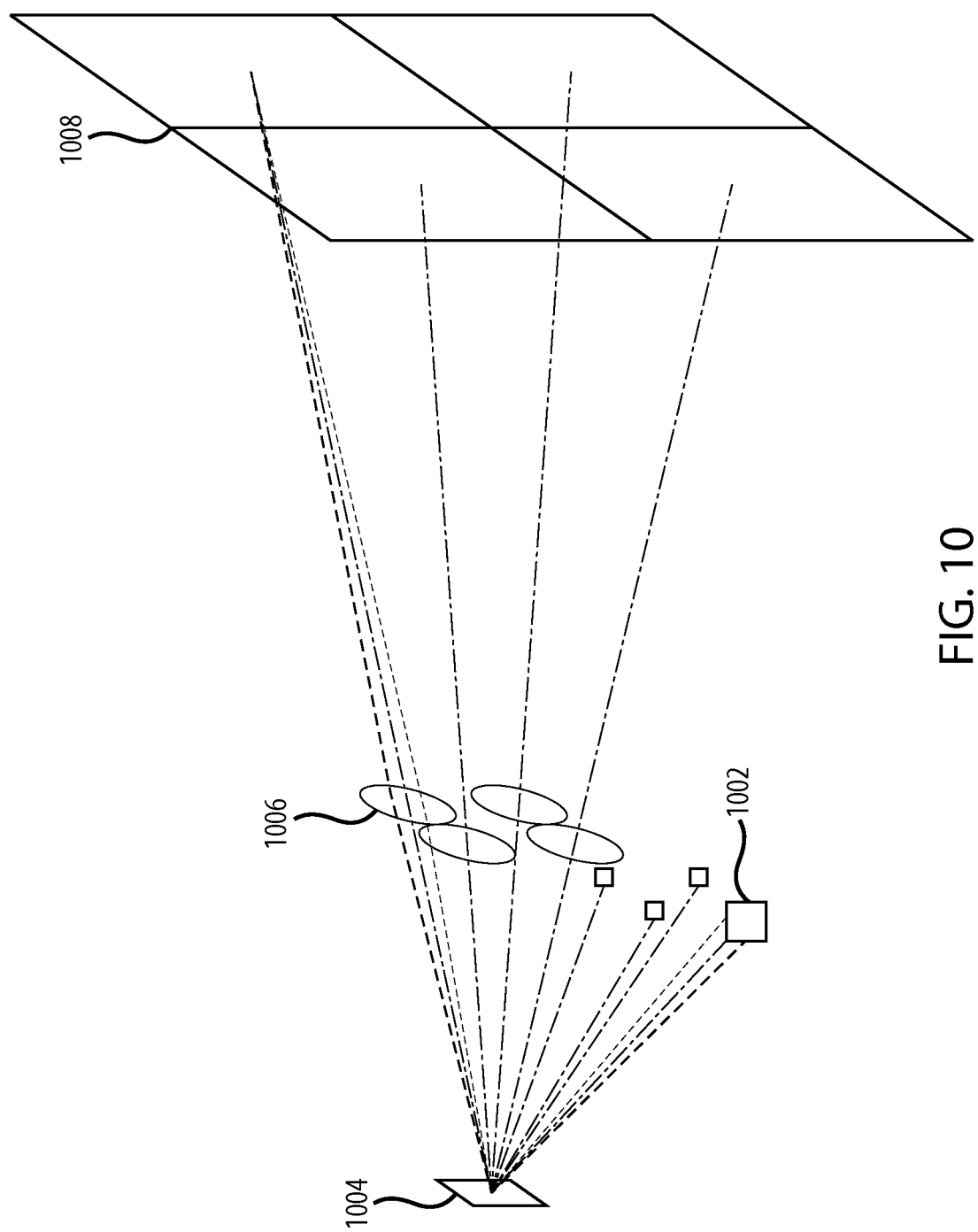
FIG. 10 is a perspective view of a projection system for field sequentially improving the spatial resolution of a projected image with an output lens array.

The focusing array may also be used with multiple light sources. FIG. 10 depicts a projection system, generally designated 1000, including multiple light sources. The projection system 1000 may include a plurality of light sources 1002, a spatial light modulator 1004, a plurality of focusing lenses 1006, and a projection surface 1008. The embodiment of FIG. 10 is substantially similar to the embodiment of FIG. 9, but in this embodiment each light source 1002 may include a plurality of closely spaced light sources (e.g., laser diodes), which may have different wavelengths (e.g., RGB, or other color combinations). By using different or additional component wavelengths, the spectrum of colors available for use in the projected image may be increased. For example, the light sources 1002 may be implemented in a similar fashion as laser towers 410A-C, as described above with respect to FIG. 4. By closely spacing a number of light sources, the projection system 1004 ensures that beams emitted by each of the closely space light sources within a single light source 1002 is modulated by the spatial light modulator 1004 and directed to a single focusing lens 1006. The focusing lens 1006 may then focus each beam at a sub-image region of projection surface 1008. The focusing lenses 1006 image each point and/or pixel of the spatial light modulator 1004 onto a single point of the projection surface 1008. Each lens of the focusing lenses 1006 focuses incident light from a single point of the spatial light modulator 1004 at a single point on the projection surface 1008, regardless of the angle of incidence. By using multiple, closely spaced light sources as shown in FIG. 10, a full color sub-image may be created for each light source 1002 by selectively activating and deactivating the closely spaced light sources in accordance with the method of FIG. 6. Larger displacements between the light sources 1002 affect the angle at which light from a given light source 1002 leaves the spatial light modulator 1004. By placing sufficient distance between individual light sources 1002, the embodiment of FIG. 10 ensures that each sub-image generated by the spatial light modulator passes only through the desired focusing lens 1006 and is focused at the desired location on the projection surface 1008.

Figure 11A:
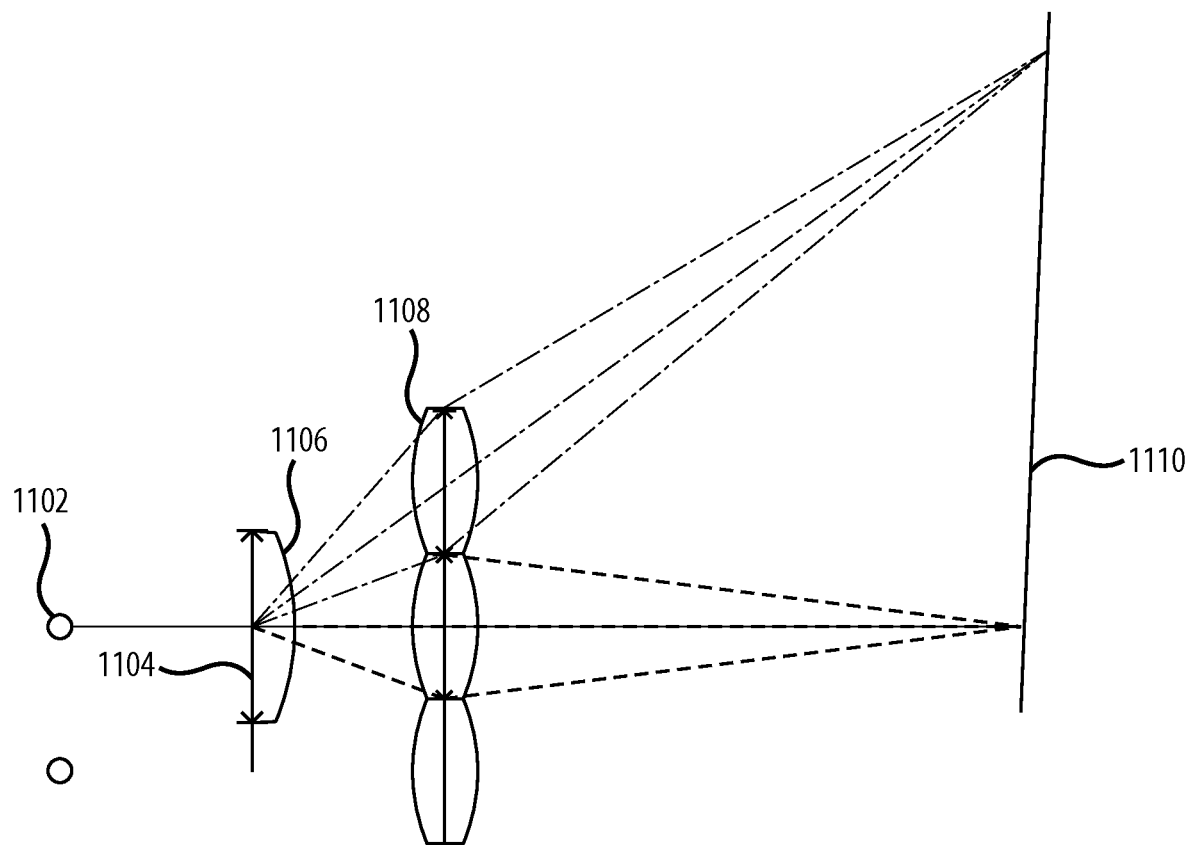
FIG. 11A is a ray diagram of a single pixel of a projected sub-image in accordance with the embodiment of FIG. 10.

FIG. 11A is a ray diagram of a single pixel of a projected sub-image in accordance with the embodiments of FIGS. 9 and 10. The embodiment of FIG. 11A generally includes one or more light sources 1102, a spatial light modulator 1104, a modulator lens 1106, one or more focusing lenses 1108, and a projection surface 1110. In various embodiments, the light sources 1102 may be implemented in the same manner as any of the light sources described above with respect to FIGS. 1-10. The spatial light modulator 1104 may be implemented in any manner described above with respect to FIGS. 1-10, such as a liquid crystal or a DMD. The modulator lens 1106 may be any optical element which redirects light leaving the spatial light modulator 1104 into converging rays. For example, the modulator lens 1106 may be a convex lens. By converging the light as it leaves the spatial light modulator 1106, the modulator lens 1106 may ensure that the light leaving the spatial light modulator 1104 is directed toward the desired focusing lens 1108. The focusing array or focusing lenses 1108 may be any optical device or combination of optical devices that re-image light transmitted from the spatial light modulator 1104 onto the projection surface 1110, such as, but not limited to, convex lenses. In certain embodiments, there is one focusing lens 1108 for each of the light sources 1102. The light rays as shown in FIG. 11A demonstrate the optical path of light reflected from a single point on the spatial light modulator 1104. This principle, in various embodiments, certain elements may be added, rearranged, or eliminated without departing from the scope of this disclosure.

Figure 11B:
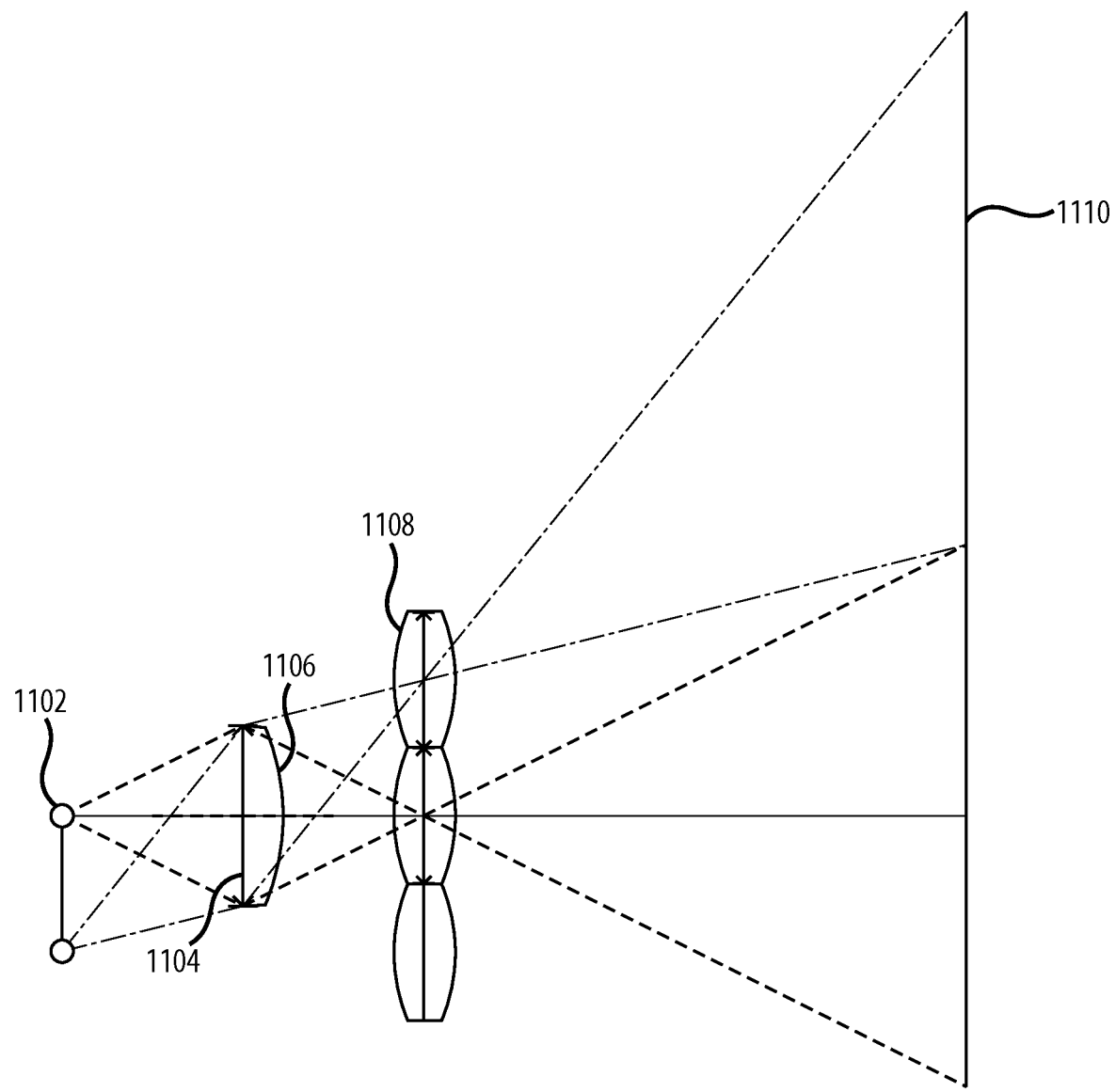
FIG. 11B is a ray diagram of a complete sub-image in accordance with the embodiment of FIG. 10.

FIG. 11B is a ray diagram of a complete sub-image in accordance with the embodiment of FIG. 11A. FIG. 11B depicts substantially the same embodiment as FIG. 11A. However, the rays of FIG. 11B show the path of complete sub-images rather than the path of individual pixels of sub-images. As shown in FIG. 11B, this embodiment results in light from two separate light sources 1102 being modulated by the spatial light modulator 1104 and redirected by the modulator lens 1106. Light from each of the light sources 1102 passes through a different focusing lens 1108 which re-images the light on the projection surface as two adjacent sub-images. As will be appreciated by those skilled in the art, the optical elements may be arranged so as to generate any desired overlap of sub-images in order to perform blending functions as described above. The resultant image appears to a viewer as a single, seamless projected image having increased spatial resolution without any diffractive ringing or shadow images resulting from the optical configuration of the spatial light modulator or other optical elements within the system.

What is claimed is:

1. A projection system for projecting one or more images onto a projection surface comprising
    a light source that when activated generates a beam of light;
    a single image forming device in optical communication with the light source, wherein the single image forming device sequentially converts the beam of light into a first sub-image, forming a first part of a projection image and a second sub-image, forming a second part of the projection image; and
    an optical system comprising a mirror galvanometer and a fixed mirror array, wherein the optical system is in optical communication with the single image forming device, wherein the optical system directs the first sub-image toward a first sub-image region of a projection surface and directs the second sub-image toward the second sub-image region spatially adjacent to the first sub-image region of the projection surface, wherein the first-sub image and the second sub-image are directed to the projection surface at a first time and a second time, respectively, wherein the first time and the second time do not overlap and the first-sub image and the second sub-image are spatially substantially non-overlapping.

2. The projection system of claim 1, wherein the first sub-image and the second sub-image are projected fast enough to avoid flickering effects.

3. The projection system of claim 1, wherein
    the projection system has a hardware spatial resolution based on hardware constraints of the light source, the single image forming device, and the optical system;
    a first sub-image spatial resolution of the first sub-image is substantially the same as the hardware spatial resolution;
    a second sub-image spatial resolution of the second sub-image is substantially the same as the hardware spatial resolution; and
    a projection image resolution of the projection image is greater than the hardware spatial resolution.

4. The projection system of claim 1, wherein the single image forming device is a digital micro-mirror device.

5. The projection system of claim 1, wherein the optical system further comprises a lens.

6. The projection system of claim 1, wherein the first sub-image and the second sub-image overlap spatially between 1 to 10 pixels.

7. The projection system of claim 6, wherein the overlapping 1 to 10 pixels of the first sub-image and the second sub-image are blended together.

8. The projection system of claim 1, wherein the first sub-image and the second sub-image overlap by up to one percent of a spatial resolution of the single image forming device.

9. A projection system comprising
    a plurality of light sources;
    a single spatial light modulator for modulating light received from the plurality of light sources to generate a plurality of sub-images of a composite image; and
    a plurality fixed mirrors for reflecting each of the plurality of sub-images at one of a plurality of spatially adjacent portions of a projection surface, wherein:
        the plurality of light sources are oriented with respect to the spatial light modulator to direct each of the plurality of sub-images from the spatial light modulator to a mirror of the plurality of fixed mirrors, and
        the plurality of sub-images are reflected onto the projection surface at discrete times and do not substantially overlap spatially with one another.

10. The projection system of claim 9, further comprising a prism positioned in an optical path between the plurality of light sources and the single spatial light modulator, and configured to combine light generated by the one or more light sources into a single beam.

11. The projection system of claim 10, wherein the prism comprises at least one of a dichroic prism, a cross-dichroic prism, and a Philips prism.

12. The projection system of claim 9, wherein the one or more light sources comprises at least one laser diode.

13. The projection system of claim 12, further comprising a laser driver circuit for selectively activating a deactivating the one or more light sources.

14. A projection system comprising
    a single image forming device for generating sub-images of a composite image;
    a plurality of laser arrays, each laser array having a set of lasers stored therein and directed toward the image forming device; and
    a plurality of fixed mirrors, wherein:
        the plurality of laser arrays are oriented with respect to the single image forming device to direct light from one laser array in the plurality of laser arrays from the single image forming device to a mirror of the plurality of fixed mirrors,
        each of the fixed mirrors in the plurality of fixed mirrors is configured to direct light from the laser array in the plurality of laser arrays toward a respective sub-image region on a projection surface, and
        the sub-images are directed onto the projection surface at separate temporal intervals and are substantially spatially non-overlapping with one another.

15. The projection system of claim 14, wherein each set of lasers comprises at least three lasers.

16. The projection system of claim 15, wherein each of the at least three lasers has an output frequency different from other lasers in the laser array.

17. The projection system of claim 14, further comprising a laser driver for individually activating each laser in the plurality of laser arrays.

18. A projection system comprising
a plurality of light sources that when activated generate a first beam of light and a second beam of light;
a single image forming device in optical communication with the light source, wherein the single image forming device sequentially modulates the first beam of light to form a first sub-image, forming a first part of a projection image and modulates the second beam of light to form a second sub-image, forming a second part of the projection image, such that the first sub-image and the second sub-image are projected at non-overlapping times from one another and at substantially non-overlapping locations from one another, wherein the plurality of light sources are oriented with respect to the single image forming device to direct the first sub-image and the second sub-image from the single image forming device to a mirror of a plurality of fixed mirrors; and
a focusing array in optical communication with the image forming device, wherein the focusing array focuses the first sub-image and the second sub-image and directs the first beam of light and the second beam of light such that the first sub-image and the second sub-image are spatially adjacent to one another.

19. The projection system of claim 18, further comprising a converging lens in optical communication with the image forming device and the focusing array.

20. The projection system of claim 18, wherein each light source of the plurality of light sources comprises one or more light emitting devices.

21. A method for projecting an image comprising configuring a single spatial light modulator to selectively modulate a first portion of a complete image;
activating a light source to emit a first light beam;
selectively modulating the first light beam off of the single spatial light modulator toward an image forming device;
configuring a mirror galvanometer to cause the image forming device to direct the first light beam toward a first mirror of an array of fixed mirrors;
directing the first portion of the complete image from the first mirror to a first sub-image region of a projection surface;
configuring the single spatial light modulator to selectively modulate a second portion of the complete image;
activating a the light source to emit a second light beam;
selectively modulating the second light beam off of the single spatial light modulator toward the image forming device; and
configuring the mirror galvanometer to cause the image forming device to direct the second light beam toward a second mirror of the array of fixed mirrors;
directing the second portion of the complete image from the second mirror to a second sub-image region spatially adjacent to the first sub-image region of the projection surface such that the first portion of the complete image and the second portion of the complete image are substantially non-overlapping, wherein the first portion and the second portion are projected at discrete times from one another.

22. The method of claim 21, wherein the first and second portions of the complete image are projected spatially adjacent to one another and overlap by no more than 10 pixels.

23. The method of claim 22, further comprising, blending the first and second portions of the complete image at a point where the first and second portions overlap.

24. The method of claim 21, wherein projecting the first portion comprises reflecting the first light beam off of a first fixed mirror toward the projection surface, and projecting the second portion comprises reflecting the second light beam off of a second fixed mirror toward the projection surface.

25. The method of claim 21, wherein a spatial resolution of the first portion of the complete image is equal to a spatial resolution of the spatial light modulator.

26. The method of claim 25, wherein the spatial resolution of the spatial light modulator is a maximum spatial resolution of the spatial light modulator.

* * * * *

UNITED STATES PATENT AND TRADEMARK OFFICE
CERTIFICATE OF CORRECTION

| | |
|---|---|
| PATENT NO. | : 11,399,164 B2 |
| APPLICATION NO. | : 14/635563 |
| DATED | : July 26, 2022 |
| INVENTOR(S) | : Nicola Ranieri et al. |

It is certified that error appears in the above-identified patent and that said Letters Patent is hereby corrected as shown below:

On the Title Page

Item (73), Assignee: delete "DISNEY ENTERPRISES, INC., Burbank, CA (US)" and insert --Disney Enterprises, Inc., Burbank, CA (US) and ETH Zurich (Eidgenoessische Technische Hochschule Zurich), Zurich, (CH)--

Signed and Sealed this
Eighteenth Day of April, 2023

Katherine Kelly Vidal
*Director of the United States Patent and Trademark Office*